United States Patent
Wang et al.

(10) Patent No.: US 12,105,357 B2
(45) Date of Patent: Oct. 1, 2024

(54) EYEGLASSES

(71) Applicant: SHENZHEN SHOKZ CO., LTD., Guangdong (CN)

(72) Inventors: Yueqiang Wang, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 908 days.

(21) Appl. No.: 16/950,876

(22) Filed: Nov. 17, 2020

(65) Prior Publication Data

US 2021/0072559 A1 Mar. 11, 2021

Related U.S. Application Data

(63) Continuation of application No. PCT/CN2019/102394, filed on Aug. 24, 2019.

(30) Foreign Application Priority Data

Aug. 24, 2018 (CN) .......................... 201810975515.1

(51) Int. Cl.
*G02C 5/00* (2006.01)
*G02C 5/14* (2006.01)
(Continued)

(52) U.S. Cl.
CPC .............. *G02C 11/10* (2013.01); *G02C 5/001* (2013.01); *G02C 5/143* (2013.01); *G02C 5/16* (2013.01);
(Continued)

(58) Field of Classification Search
CPC ...... G02C 5/2254; G02C 5/001; G02C 5/143; G02C 5/16; G02C 5/2227; G02C 11/10
(Continued)

(56) References Cited

U.S. PATENT DOCUMENTS 4,902,120 A 2/1990 Weyer
5,745,209 A * 4/1998 Khantzis .............. G02C 5/2227
351/113
(Continued)

FOREIGN PATENT DOCUMENTS

CN 2639920 Y 9/2004
CN 102141688 A 8/2011
(Continued)

OTHER PUBLICATIONS

International Search Report in PCT/CN2019/102394 mailed on Nov. 28, 2019, 8 pages.
(Continued)

*Primary Examiner* — Mahidere S Sahle
(74) *Attorney, Agent, or Firm* — Metis IP LLC

(57) ABSTRACT

The present disclosure embodiment may disclose eyeglasses. The eyeglasses may include an eyeglass frame and two speakers. The eyeglass frame may include an eyeglass rim and two eyeglass temples. The two eyeglass temples may be rotatably connected to the eyeglass rim, respectively. The two speakers may include an earphone core. The two speakers may be connected to the two eyeglass temples via hinge components of the two eyeglass temples, respectively. Each hinge components may be rotatable to change a position of its connected speakers relative to one of the two eyeglass temples. The eyeglasses of the present disclosure may satisfy various requirements when a user wears the eyeglasses, and the hinge state may be switched easily, thereby providing convenience for the user.

20 Claims, 20 Drawing Sheets

(51) Int. Cl.
   *G02C 5/16* (2006.01)
   *G02C 5/22* (2006.01)
   *G02C 11/00* (2006.01)
   *H04R 1/02* (2006.01)
   *H04R 1/10* (2006.01)
   *H04R 5/033* (2006.01)
   *H04R 9/02* (2006.01)
   *H04R 9/04* (2006.01)
   *H04R 9/06* (2006.01)
   *G02C 5/20* (2006.01)

(52) U.S. Cl.
   CPC ......... *G02C 5/2218* (2013.01); *G02C 5/2227* (2013.01); *G02C 5/2254* (2013.01); *H04R 1/025* (2013.01); *H04R 1/028* (2013.01); *H04R 1/1008* (2013.01); *H04R 1/1066* (2013.01); *H04R 5/0335* (2013.01); *H04R 9/025* (2013.01); *H04R 9/045* (2013.01); *H04R 9/06* (2013.01); *G02C 5/20* (2013.01); *H04R 2400/03* (2013.01); *H04R 2460/13* (2013.01); *H04R 2499/10* (2013.01)

(58) Field of Classification Search
   USPC .................................................. 351/140–158
   See application file for complete search history.

(56) References Cited

U.S. PATENT DOCUMENTS

| | | | |
|---|---|---|---|
| 7,289,767 | B2 | 10/2007 | Li |
| 2008/0013041 | A1 | 1/2008 | Chou |
| 2008/0074609 | A1 | 3/2008 | Ifergan |
| 2011/0200204 | A1 | 8/2011 | Horigome et al. |
| 2013/0201438 | A1* | 8/2013 | Gasparetto ............... G02C 5/22 351/178 |
| 2014/0253867 | A1 | 9/2014 | Jiang et al. |
| 2015/0257662 | A1 | 9/2015 | Lee et al. |
| 2016/0234613 | A1 | 8/2016 | Westerkull |
| 2016/0246076 | A1 | 8/2016 | Wei |
| 2017/0090201 | A1 | 3/2017 | Guo |
| 2017/0208398 | A1* | 7/2017 | Ruppersberg ........ H04R 25/604 |
| 2019/0204617 | A1* | 7/2019 | Yang ...................... G02C 5/143 |
| 2019/0238971 | A1* | 8/2019 | Wakeland ................ H04R 1/24 |
| 2020/0336824 | A1 | 10/2020 | Zheng et al. |
| 2020/0344542 | A1 | 10/2020 | Liu et al. |

FOREIGN PATENT DOCUMENTS

| | | | | |
|---|---|---|---|---|
| CN | 201984240 | U | 9/2011 | |
| CN | 202306037 | U | 7/2012 | |
| CN | 202364340 | U | 8/2012 | |
| CN | 203786416 | U | 8/2014 | |
| CN | 204374548 | U | 6/2015 | |
| CN | 105007551 | A | 10/2015 | |
| CN | 204887455 | U | 12/2015 | |
| CN | 205103503 | U | 3/2016 | |
| CN | 205301727 | U | 6/2016 | |
| CN | 205720956 | U | 11/2016 | |
| CN | 205793159 | U | 12/2016 | |
| CN | 205961389 | U | 2/2017 | |
| CN | 206061075 | U | 3/2017 | |
| CN | 206292473 | U | 6/2017 | |
| CN | 106937221 | A | 7/2017 | |
| CN | 106954150 | A | 7/2017 | |
| CN | 106954151 | A | 7/2017 | |
| CN | 106954153 | A | 7/2017 | |
| CN | 106974645 | A | 7/2017 | |
| CN | 206365029 | U | 7/2017 | |
| CN | 106997107 | A | 8/2017 | |
| CN | 206387972 | U | 8/2017 | |
| CN | 206421112 | U | 8/2017 | |
| CN | 206563855 | U | 10/2017 | |
| CN | 206640748 | U | 11/2017 | |
| CN | 206920741 | U | 1/2018 | |
| CN | 107948881 | A | 4/2018 | |
| CN | 207424414 | U | 5/2018 | |
| CN | 207443120 | U | 6/2018 | |
| CN | 108391188 | A | 8/2018 | |
| CN | 207718105 | U | 8/2018 | |
| CN | 207720370 | U | 8/2018 | |
| CN | 108600920 | A | 9/2018 | |
| CN | 108776393 | A | 11/2018 | |
| CN | 108845436 | A | 11/2018 | |
| CN | 108873372 | A | 11/2018 | |
| CN | 109061902 | A | 12/2018 | |
| CN | 109495809 | A | 3/2019 | |
| CN | 208780924 | U | 4/2019 | |
| CN | 208780925 | U | 4/2019 | |
| CN | 208780926 | U | 4/2019 | |
| CN | 208780932 | U | 4/2019 | |
| CN | 208847977 | U | 5/2019 | |
| CN | 208847981 | U | 5/2019 | |
| CN | 110022516 | A | 7/2019 | |
| CN | 209184747 | U | 7/2019 | |
| CN | 209267805 | U | 8/2019 | |
| EP | 2056157 | A1 * | 5/2009 | ......... G02B 27/0176 |
| JP | S59161928 | A | 9/1984 | |
| JP | 2006157318 | A | 6/2006 | |
| KR | 101819530 | B1 * | 1/2018 | |
| WO | 9623373 | A1 | 8/1996 | |
| WO | 2006023341 | A2 | 3/2006 | |
| WO | 2007070508 | A2 | 6/2007 | |
| WO | 2007133055 | A1 | 11/2007 | |
| WO | 2015115693 | A1 | 8/2015 | |
| WO | WO-2019035558 | A1 * | 2/2019 | ............. H04B 1/034 |

OTHER PUBLICATIONS

International Search Report in PCT/CN2019/102377 mailed on Dec. 3, 2019, 8 pages.
International Search Report in PCT/CN2019/102378 mailed on Nov. 6, 2019, 8 pages.
International Search Report in PCT/CN2019/102385 mailed on Nov. 18, 2019, 6 pages.
International Search Report in PCT/CN2019/102389 mailed on Nov. 28, 2019, 8 pages.
International Search Report in PCT/CN2019/102396 mailed on Nov. 27, 2019, 8 pages.
International Search Report in PCT/CN2019/102395 mailed on Nov. 27, 2019, 9 pages.
International Search Report in PCT/CN2019/102406 mailed on Nov. 26, 2019, 7 pages.
International Search Report in PCT/CN2019/102407 mailed on Nov. 8, 2019, 6 pages.
International Search Report in PCT/CN2019/102408 mailed on Nov. 6, 2019, 6 pages.
International Search Report in PCT/CN2019/102398 mailed on Oct. 31, 2019, 6 pages.
International Search Report in PCT/CN2019/102386 mailed on Nov. 25, 2019, 7 pages.
International Search Report in PCT/CN2019/102390 mailed on Nov. 22, 2019, 8 pages.
International Search Report in PCT/CN2019/102391 mailed on Nov. 22, 2019, 8 pages.
First Office Action in Chinese Application No. 201810975515.1 mailed on Apr. 13, 2023, 23 pages.

\* cited by examiner

EYEGLASSES

CROSS-REFERENCE TO RELATED APPLICATION

This application is a Continuation of International Application No. PCT/CN2019/102394, filed on Aug. 24, 2019, which claims priority of Chinese Patent Application No. 201810975515.1 filed on Aug. 24, 2018, the contents of each of which are hereby incorporated by reference in its entirety.

TECHNICAL FIELD

The present disclosure relates to the field of eyeglasses, and more specifically relates to eyeglasses having a hinge component.

BACKGROUND

People often wear eyeglasses in daily life, such as short-sighted eyeglasses, far-sighted eyeglasses, sunglasses, virtual reality (VR) eyeglasses, massage eyeglasses, etc. However, these eyeglasses have a single function and cannot meet multiple requirements of people at the same time. For example, people often wear sunglasses when going out for sports or traveling. However, if they want to listen to music at the same time, they need to prepare additional earphones, which is not convenient to carry and store. Therefore, eyeglasses with an earphone function bring great convenience to users.

SUMMARY

An embodiment of the present disclosure may provide eyeglasses. The eyeglasses may include an eyeglass frame and two speakers. The eyeglass frame may include an eyeglass rim and two eyeglass temples. The two eyeglass temples may be rotatably connected to the eyeglass rim, respectively. The two speakers may include an earphone core. The two speakers may be connected to the two eyeglass temples via hinge components of the two eyeglass temples, respectively. Each hinge components may be rotatable to change a position of its connected speakers relative to one of the two eyeglass temples. Each of the eyeglass temples may include an accommodation body and a cover. The accommodation body may include a chamber. An end of the chamber may have an opening. The cover may be disposed on the opening for sealing the chamber. The eyeglass temple may include a circuit component to drive the earphone core to vibrate to generate a sound.

In some embodiments, the hinge component may include a hinge, a rod-shaped member, and a fixing member. The hinge may include a hinge mount, a hinge arm, a support member, and an elastic member. The hinge arm may be rotatably connected to the hinge mount via a rotating shaft. When an external force is applied to the hinge arm to change the position of the speaker relative to the eyeglass temple, the hinge arm may be rotatable relative to the hinge mount. The support member may be flexibly disposed on the hinge mount. The elastic member may be configured to elastically offset the support member toward the hinge arm, so that the support member elastically abuts on the hinge arm.

In some embodiments, the hinge arm may include a first support surface and a second support surface connected to each other. The support member may include a third support surface. When the elastic member elastically offsets the support member toward the hinge arm, the third support surface may elastically abut on the first support surface and the second support surface, respectively. When the hinge arm is rotated relative to the hinge mount by the external force, a connection between the first support surface and the second support surface may drive the support member against the elastic offset of the elastic member to move in an opposite direction, so that the third support surface may be switched from being elastically abutting on one of the first support surface and the second support surface to being elastically abutting on the other of the first support surface and the second support surface.

In some embodiments, a ratio between a maximum distance from the rotating shaft to the connection and a shortest distance from the rotating shaft to the first support surface may be between 1.1 and 1.5 in a section perpendicular to a central axis of the rotating shaft.

In some embodiments, an included angle between the hinge mount and the hinge arm may become smaller when the third support surface is switched from elastically abutting on the first support surface to elastically abutting on the second support surface.

In some embodiments, an external force required when the third support surface is switched from elastically abutting on the first support surface to elastically abutting on the second support surface may be different from an external force required when the third support surface is switched from elastically abutting on the second support surface to elastically abutting on the first support surface.

In some embodiments, the connection may have an arc shape in a section perpendicular to a central axis of the rotating shaft.

In some embodiments, the connection may have a circular arc shape. A curvature of the circular arc may be between 5 and 30.

In some embodiments, an included angle between the first support surface and the second support surface may be an obtuse angle in a section perpendicular to a central axis of the rotating shaft.

In some embodiments, the hinge mount may include a mount body. A first lug and a second lug may protrude from the mount body and be spaced from each other. The hinge arm may include an arm body and a third lug protruding from the arm body. The third lug may be inserted into an interval region between the first lug and the second lug, and rotatably connected to the first lug and the second lug via the rotating shaft.

In some embodiments, the support member may be at least partially disposed inside the interval region and located at a side of the third lug towards the mount body. The mount body may be disposed with an accommodation chamber communicating with the interval region. The elastic member may be disposed inside the accommodation chamber. The support member may elastically offset toward the third lug.

In some embodiments, the cover may include a bracket and a cover layer integrally forming on a surface of the bracket by injection molding. The bracket may be used to be physically connected to the accommodation body. The cover layer may be used to seal the chamber after the bracket is connected to the accommodation body.

In some embodiments, a shape of a side of the bracket towards the accommodation body may match the opening to cover the opening. The cover layer may cover an outer surface of the bracket away from the accommodation body.

In some embodiments, the bracket may include an inserting portion and a covering portion. The covering portion may be disposed on the opening. The inserting portion may be disposed on a side of the covering portion and extend into the chamber along an inner wall of the chamber to fix the covering portion on the opening.

In some embodiments, the accommodation body may include an opening edge for defining the opening. The covering portion may be pressed onto an inner region of the opening edge near to the opening. The cover layer may cover the outer surface of the covering portion away from the accommodation body, and be pressed onto an outer region of a periphery of the inner region of the opening edge, thereby sealing the cover with the opening edge.

In some embodiments, a contact end surface of the covering portion and the opening edge and a contact end surface of the cover layer and the opening edge may be flush with each other in a covered state. Alternatively, the cover layer may further extend between the covering portion and the opening edge, and the covering portion may be pressed onto the inner region of the opening edge.

In some embodiments, a switch may be disposed on the circuit component. The bracket may be disposed with a switch hole corresponding to the switch and the cover layer may cover the switch hole. A pressing portion may be disposed at a position corresponding to the switch hole and the pressing portion may extend toward an inside of the chamber through the switch hole. When the corresponding position of the cover layer is pressed, the pressing portion may press the switch of the circuit component, thereby triggering the circuit component to perform a preset function.

In some embodiments, the speaker may further include a core housing, an annular blocking wall, a waterproof membrane component, and a rigid support plate. The core housing may be disposed with a first sound inlet. The annular blocking wall may be integrally formed on an inner surface of the core housing and disposed on a periphery of the first sound inlet, thereby defining an accommodation space connected to the first sound inlet. The waterproof membrane component may be disposed inside the accommodation space and cover the first sound inlet. The rigid support plate may be disposed in the accommodation space and press the waterproof membrane component on the inner surface of the core housing. The rigid support plate may be disposed with a second sound inlet.

In some embodiments, the waterproof membrane component may include a waterproof membrane body and a first annular rubber gasket disposed on one side of the waterproof membrane body towards the rigid support plate. The first annular rubber gasket may be disposed on the periphery of the first sound inlet and a periphery of the second sound inlet. The rigid support plate may be pressed against the first annular rubber gasket.

In some embodiments, the first annular rubber gasket may be arranged to form a sealed chamber communicating to the microphone and only through the second sound inlet between the waterproof membrane body and the rigid support plate.

In some embodiments, the waterproof membrane component may further include a second annular rubber gasket disposed on one side of the waterproof membrane body towards the inner surface of the core housing and overlapping the first annular rubber gasket.

In some embodiments, the core housing may include a main housing and a baffle component. The baffle component may be located inside the main housing and connected to the main housing, thereby dividing an inner space of the main housing into a first accommodation space and a second accommodation space. The core housing may be further disposed with a connection hole communicating with an outer end surface of the core housing.

In some embodiments, the second accommodation space may be disposed near the connection hole.

In some embodiments, the main housing may include a peripheral side wall and a bottom end wall connected to one end surface of the peripheral side wall.

In some embodiments, the baffle component may include a side baffle connected at both ends to the peripheral side wall and a bottom baffle spaced from the bottom end wall and connected to the peripheral side wall and the side baffle, respectively. The bottom baffle may be disposed with a wiring hole. The side baffle may be disposed with a wiring groove at a top edge away from the bottom end wall.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
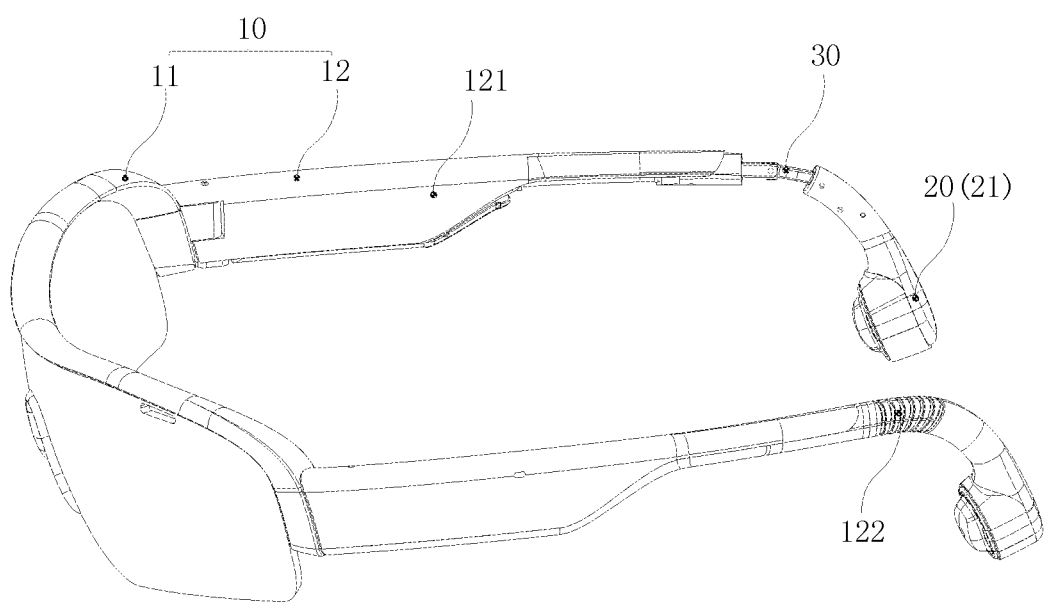
FIG. 1 is a schematic structural diagram illustrating eyeglasses according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

As used in the disclosure and the appended claims, the singular forms "a," "an," and "the" may include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The term "based on" is "based at least in part on." The term "one embodiment" means "at least one embodiment;" the term "another embodiment" means "at least one other embodiment." Related definitions of other terms will be given in the description below. In the following, without loss of generality, the "eyeglasses" or "sunglasses" described in the present disclosure means "eyeglasses" or "sunglasses" with a speaker. For those skilled in the art, "eyeglasses" or "sunglasses" may also be replaced with other similar words, such as "eye protection device," "eye wearable device," or the like. "Speaker" may also be replaced with other similar words, such as "speaker," "hearing aid," "player," "playing device," or the like. For those skilled in the art, after understanding the basic principles of eyeglasses, it may be possible to make various modifications and changes in the form and details of the specific methods and operations of implementing eyeglasses without departing from the principles. In particular, an environmental sound collection and processing function may be added to the eyeglasses to enable the eyeglasses to implement the function of a hearing aid. For example, a microphone may collect environmental sounds of a user/wearer, process the sounds using an algorithm and transmit the processed sound (or generated electrical signal) to a speaker of eyeglasses. That is, the eyeglasses may be modified to include the function of collecting the environmental sounds, and after a signal processing, the sound may be transmitted to the user/wearer via the speaker, thereby implementing the function of the hearing aid. As an example, the algorithm mentioned herein may include noise cancellation, automatic gain control, acoustic feedback suppression, wide dynamic range compression, active environment recognition, active noise reduction, directional processing, tinnitus processing, multi-channel wide dynamic range compression, active howling suppression, volume control, or the like, or any combination thereof.

Referring to FIG. 1, FIG. 1 is a schematic structural diagram illustrating eyeglasses according to an embodiment of the present disclosure. In the embodiment, the eyeglasses may include an eyeglass frame 10 and a function member 20.

In some embodiments, the eyeglass frame 10 in the present disclosure may include eyeglass frames of various eyeglasses such as short-sighted glasses, far-sighted glasses, sunglasses, 3D eyeglasses, etc., and be not limited herein.

The function member 20 may be connected to the eyeglass frame 10 so that the eyeglasses may further have some other functional modules or components. For example, the function member 20 may include a speaker including a bone conduction speaker, an air conduction speaker, or the like. Of course, the function member 20 may also include other components, such as a positioning device, and be not limited herein.

In some embodiments, the eyeglass frame 10 may include an eyeglass rim 11 and two eyeglass temples 12. The eyeglass temple 12 may include a main body 121 of the eyeglass temple and a hinge component 122. The main body 121 may be rotatably connected to the eyeglass rim 11. A speaker 21 may be connected to the eyeglass temple 12 via the hinge component 122.

Figure 2:
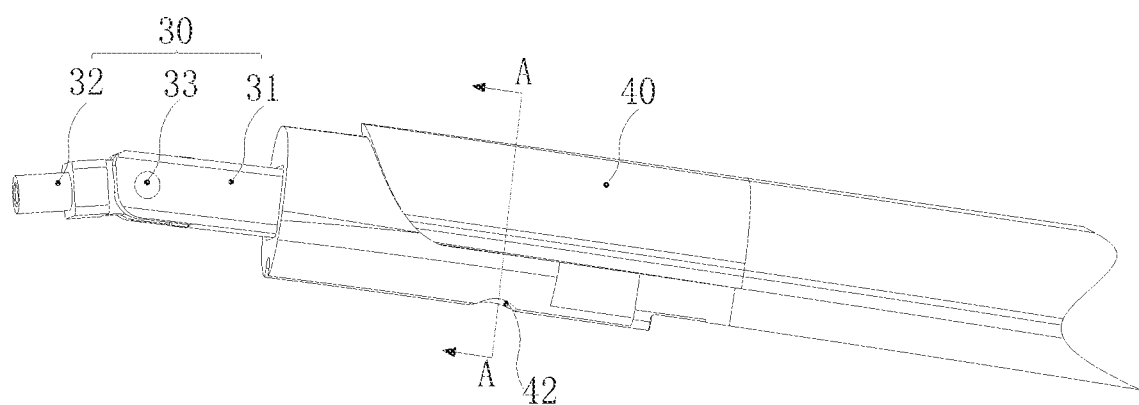
FIG. 2 is a schematic structural diagram illustrating a hinge component according to some embodiments of the present disclosure.
Figure 3:
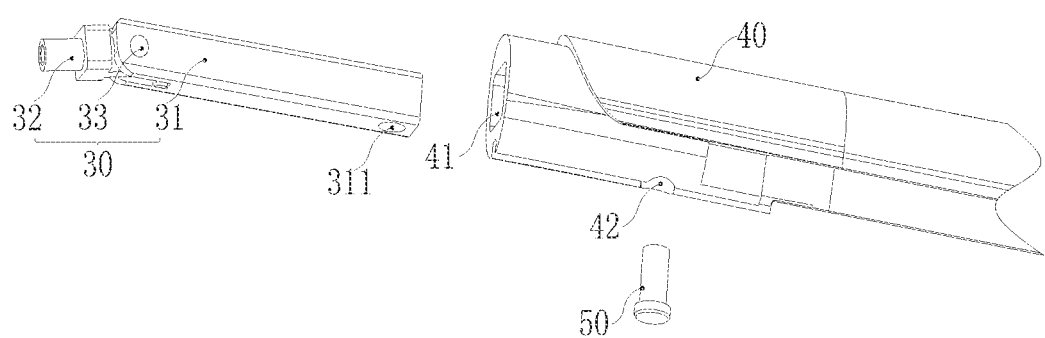
FIG. 3 is a schematic diagram illustrating an explosion structure according to some embodiments of the present disclosure.

FIG. 2 is a schematic structural diagram illustrating a hinge component according to an embodiment of the present disclosure. FIG. 3 is an exploded structural schematic diagram illustrating a hinge component according to an embodiment of the present disclosure. In some embodiments, the hinge component 122 of the present disclosure may be used in eyeglasses in some embodiment of the present disclosure.

In the present disclosure, the hinge component 122 may include a hinge 30. The hinge 30 may be a structure used to connect two solids and allow a relative rotation between the two solids.

Specifically, when the hinge component 122 in the embodiment is used in the embodiment of the eyeglasses described above, the hinge component 122 may be disposed at an end of the main body 121 of the eyeglass temple away from the eyeglass rim 11. The function member 20 may further be connected to the end of the main body 121 of the eyeglass temple away from the eyeglass rim 11 via the hinge 30.

In some embodiments, the hinge component 122 may also include a rod-shaped member 40 and a fixing member 50. In some embodiments, the hinge 30 may include a hinge mount 31 and a hinge arm 32. In some embodiments, the hinge arm 32 may be rotatably connected to the hinge mount 31 via a rotating shaft 33. It is easily understood that the hinge mount 31 and the hinge arm 32 may be respectively connected to two members that need to be rotatably connected. Therefore, the two members may be rotatably connected together via the rotating shaft 33 of the hinge 30.

In some embodiments, the hinge mount 31 of the hinge 30 may be connected to the rod-shaped member 40. In some embodiments, the rod-shaped member 40 may be a partial structure or an integral structure of one of the two members that are rotatably connected via the hinge 30. Alternatively, the rod-shaped member 40 may be a connection structure that connects one of the two members that need to be rotatably connected to the hinge 30. When the hinge component 122 in the embodiment is used for the eyeglasses, the rod-shaped member 40 may be at least a portion of the main body 121 of the eyeglass temple of the eyeglasses. For example, the rod-shaped member 40 may be the entirety of the main body 121 of the eyeglass temple. Alternatively, the rod-shaped member 40 may be a portion of an end of the main body 121 of the eyeglass temple away from the eyeglass rim 11. The hinge 30 may be disposed at the end of the main body 121 of the eyeglass temple away from the eyeglass rim 11 via the portion of the main body 121 of the eyeglass temple.

Specifically, the rod-shaped member 40 may be provided with a hinge chamber 41 connected to an end surface of the rod-shaped member 40 along the length direction. A side wall of the rod-shaped member 40 may be provided with a first insertion hole 42 communicating with the hinge chamber 41. The end of the hinge mount 31 away from the hinge arm 32 may be inserted into the hinge chamber 41 from the end surface of the rod-shaped member 40, and fixed in the hinge chamber 41 via a fixing member 50 inserted in the first insertion hole 42.

In the embodiment, the hinge chamber 41 may communicate with the end surface of the main body 121 of the eyeglass temple away from the end of the eyeglass rim 11. Therefore, the hinge mount 31 is inserted into the hinge chamber 41 and the hinge 30 is connected to the main body 121 of the eyeglass temple.

In some embodiments, the hinge chamber 41 may be formed during a molding process of the rod-shaped member 40. For example, the material of the rod-shaped member 40 may be rubber or plastic. At this time, the hinge chamber 41 may be formed by injection molding. The shape of the hinge chamber 41 may match the hinge mount 31 so that the hinge mount 31 may be accommodated inside the hinge chamber 41. In the embodiment, the main body 121 of the eyeglass temple may have the shape of a long straight rod along the length direction. Correspondingly, the rod-shaped member 40 may be a straight rod along the length direction, and the hinge chamber 41 may be disposed inside the straight rod. Further, the hinge mount 31 may match the hinge chamber 41 to be accommodated inside the hinge chamber 41 to implement the installation of the hinge 30. Of course, in other embodiments, the rod-shaped member 40 may also have other shapes such as an arc-shaped rod.

In addition, the first insertion hole 42 may be formed during the molding process of the rod-shaped member 40, or may be further formed on a side wall of the rod-shaped member by a manner such as drilling after the molding process. Specifically, in the embodiment, the shape of the first insertion hole 42 may be a circle, and may be other shapes such as a square or a triangle in other embodiments. The shape of the fixing member 50 may match the first insertion hole 42 so that the fixing member 50 may be inserted into the first insertion hole 42 from the outside of the rod 40. Further, the hinge mount 31 may be fixed inside the hinge chamber 41 by abutting the side wall of the hinge mount 31 or further penetrating the outer wall of the hinge mount 31 in a plugging manner. Specifically, a matching thread may be provided on the inner wall of the first insertion hole 42 and the outer wall of the fixing member 50. Therefore, the fixing member 50 may be connected to the first insertion hole 42 in a screwing manner to further fix the hinge mount 31 inside the hinge chamber 41. Of course, other manners may also be used, such as connecting the first insertion hole 42 and the fixing member 50 in an interference fit manner.

Further, the hinge arm 32 may also be connected to other components. Therefore, after the other components are connected to the hinge arm 32, the other components and the rod-shaped member 40 or other components connected to the rod-shaped member 40 may further rotate around the rotating shaft 33 by mounting the hinge mount 31 inside the hinge chamber 41. For example, when the hinge component 122 is used in the eyeglasses, the function member 20 (e.g., the speaker 21) may be connected to the end of the hinge arm 32 away from the hinge mount 31. Therefore, the function member 20 may be connected to the end of the main body 121 of the eyeglass temple away from the eyeglass rim 11 via the hinge 30.

In the above manner, the rod-shaped member 40 may be provided with the hinge chamber 41 communicating with the end surface of the rod-shaped member 40. The hinge 30 may be accommodated inside the hinge chamber 41 via the hinge mount 31. The fixing member 50 may further penetrate the side wall of the rod 40 via the first insertion hole 42. Therefore, the hinge mount 31 accommodated inside the hinge chamber 41 may be fixed inside the hinge chamber 41. Therefore, the hinge 30 may be detached relative to the rod-shaped member 40 to facilitate the replacement of the hinge 30 or the rod-shaped member 40. When applied to the eyeglasses in the embodiment of the present disclosure described above, the hinge 30 and the function member 20 may be detachable relative to the main body 121 of the eyeglass temple. Therefore, it may be easy to replace when the function member 20, the eyeglass rim 11, or the main body 121 of the eyeglass temple is damaged.

Further referring to FIG. 3, in one embodiment, the hinge mount 31 may be provided with a second insertion hole 311 corresponding to the first insertion hole 42. The fixing member 50 may be further inserted into the second insertion hole 311.

Specifically, the shape of the second insertion hole 311 may match the fixing member 50, so that the fixing member 50 may be further inserted into the second insertion hole 311 to fix the hinge mount 31 after passing through the first insertion hole 42. Therefore, the shaking of the hinge mount 31 inside the hinge chamber 41 may be reduced and the hinge 30 may be fixed more firmly. Specifically, similar to the connection manner of the first insertion hole 42 and the fixing member 50, the inner wall of the second insertion hole 311 may be provided with a matching thread corresponding to the outer wall of the fixing member 50. Therefore, the fixing member 50 and the hinge mount 31 may be screwed together. Alternatively, the inner wall of the second insertion hole 311 and the outer wall of a corresponding contact position of the fixing member 50 may be smooth surfaces. Therefore, the fixing member 50 and the second insertion hole 311 may be in an interference fit, and be not specifically limited herein.

Further, the second insertion hole 311 may penetrate both sides of the hinge mount 31, so that the fixing member 50 may further penetrate the entire hinge mount 31. The hinge mount 31 may be more firmly fixed inside the hinge chamber 41.

Figure 4:
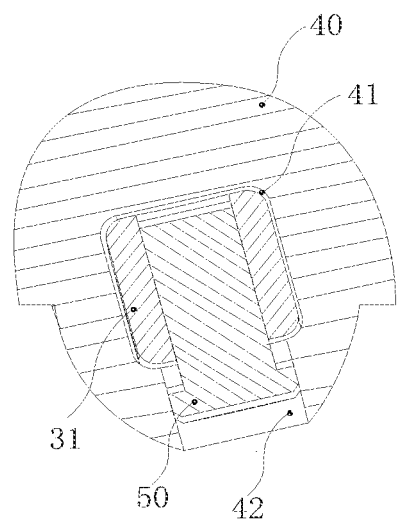
FIG. 4 illustrates a sectional view of the hinge component in FIG. 2 along an A-A axis according to some embodiments of the present disclosure.

Further referring to FIG. 4, FIG. 4 is a sectional view of the hinge component 122 in FIG. 2 along an A-A axis according to some embodiments of the present disclosure. In the embodiment, a cross-sectional shape of the hinge mount 31 may match a cross-sectional shape of the hinge chamber 41 in a section perpendicular to the longitudinal direction of the rod-shaped member 40. Therefore, the hinge mount 31 and the rod-shaped member 40 may form a tight fit after the insertion.

In some embodiments, the cross-sectional shape of the hinge mount 31 and the cross-sectional shape of the hinge chamber 41 may include any shape in the section shown in FIG. 4, as long as the hinge mount 31 is inserted into the hinge chamber 41 from an end surface of the rod-shaped member 40 away from the hinge arm 32. Further, the first insertion hole 42 may be disposed on a side wall of the hinge chamber 41, and pass through the side wall of the hinge chamber 41 and communicate with the hinge chamber 41.

In an application scenario, the cross-sectional shape of the hinge mount 31 and the cross-sectional shape of the hinge chamber 41 may have a rectangular shape. The first insertion hole 42 may be perpendicular to one side of the rectangle.

Specifically, in the application scenario, a corner angle of the outer wall of the hinge mount 31 or an angle of the inner wall of the hinge chamber 41 may be further in a fillet set to make contact between the hinge mount 31 and the hinge chamber 41 smoother. Therefore, the hinge mount 31 may be smoothly inserted into the hinge chamber 41.

It should be further pointed out that an amount of gas may be stored in the hinge chamber 41 before the hinge 30 is assembled. Therefore, if the hinge chamber 41 is a chamber with an open at only one end, the assembly of the hinge mount 31 may not be facilitated due to the difficulty in exhausting the gas inside the hinge chamber 41 during the assembly process. In the embodiment, the first insertion hole 42 may penetrate the side wall of the hinge chamber 41 and communicate with the hinge chamber 41 which may assist in exhausting the inner gas from the first insertion hole 42 through the hinge chamber 41 during the assembly, thereby facilitating the normal assembly of the hinge 30.

Figure 5:
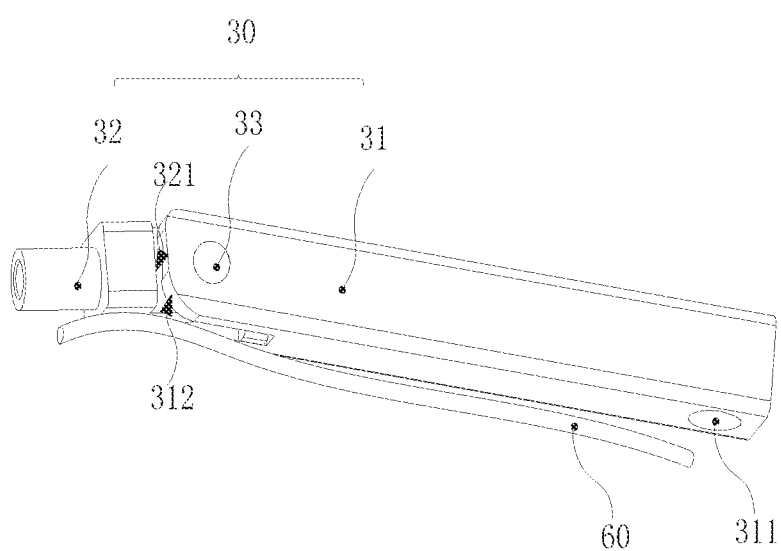
FIG. 5 is a schematic structural diagram illustrating a hinge component according to some embodiments of the present disclosure.
Figure 6:
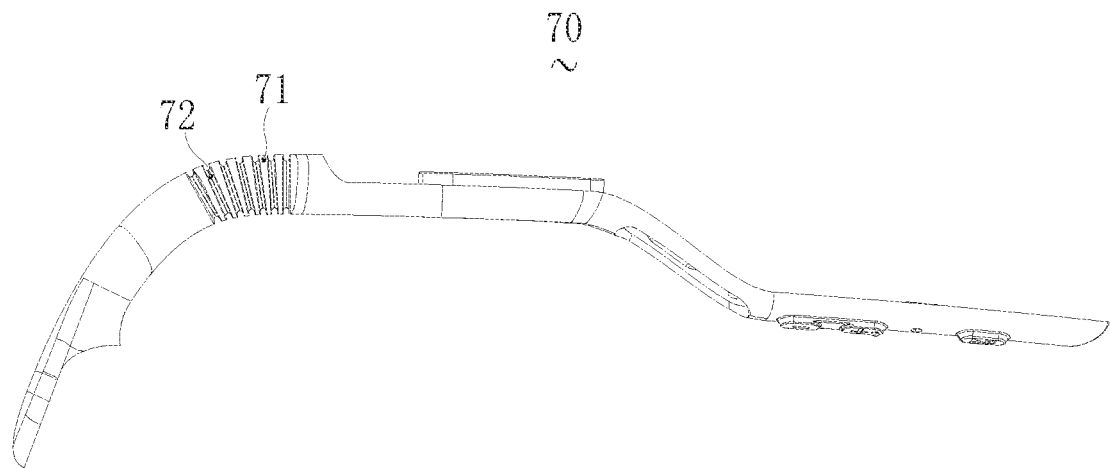
FIG. 6 is a diagram illustrating an original state of a protective sleeve according to some embodiments of the present disclosure.

Further referring to FIG. 5, FIG. 5 is a schematic structural diagram illustrating a hinge component according to an embodiment of the present disclosure. In the embodiment of the present disclosure, the hinge component 122 may further include a connection wire 60 disposed outside the hinge 30.

In some embodiments, the connection wire 60 may be a connection wire 60 having an electrical connection function and/or a mechanical connection function. When applied to the eyeglasses in the embodiment of the present disclosure described above, the hinge component 122 may be used to connect the function member 20 to the end of the main body 121 of the eyeglass temple away from the eyeglass rim 11. A control circuit and the like related to the function member 20 may be disposed on the main body 121 of the eyeglass temple. At this time, the connection wire 60 may be required to electrically connect the function member 20 to the control circuit and the like of the main body 121 of the eyeglass temple. Specifically, the connection wire 60 may be located at one side of the hinge mount 31 and the hinge arm 32, and disposed in the same accommodation space with the hinge 30.

Further, the hinge mount 31 may include a first end surface 312. The hinge arm 32 may have a second end surface 321 disposed opposite the first end surface 312. It is easily understood that there is a gap between the first end surface 312 and the second end surface 321. Therefore, the hinge mount 31 and the hinge arm 32 may be relatively rotated around the rotating shaft 33. In the embodiment, during the relative rotation of the hinge arm 32 and the hinge mount 31, relative positions between the first end surface 312 and the second end surface 321 may also change. Therefore, the gap between thereof may become larger or smaller.

In the embodiment, the gap between the first end surface 312 and the second end surface 321 may always be kept larger than or less than the diameter of the connection wire 60. Therefore, the connection wire 60 located outside the hinge 30 may not be inserted into the gap between the first end surface 312 and the second end surface 321 during the relative rotation of the hinge mount 31 and the hinge arm 32, thereby reducing the damage to the connection wire 60 by the hinge. Specifically, during the relative rotation of the hinge arm 32 and the hinge mount 31, the ratio of the gap between the first end surface 312 and the second end surface 321 to the diameter of the connection wire 60 may always be kept greater than 1.5 or less than 0.8, for example, greater than 1.5, 1.7, 1.9, 2.0, etc., or less than 0.8, 0.6, 0.4, 0.2, etc., and be not specifically limited herein.

Figure 7:
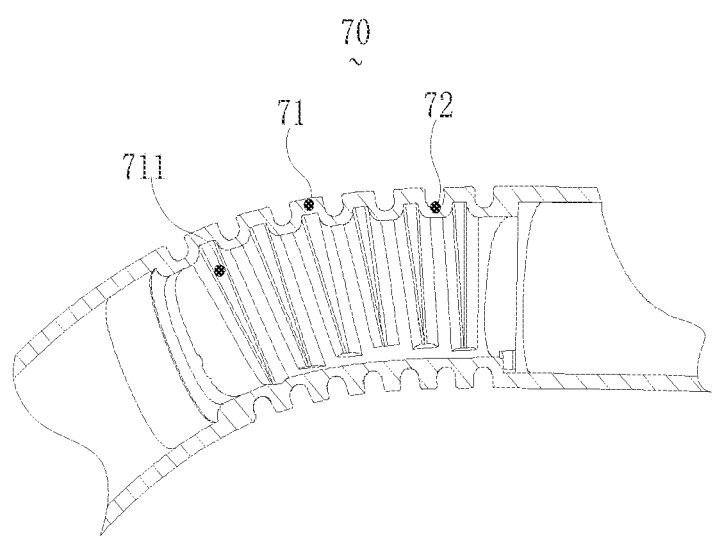
FIG. 7 is a partial sectional view illustrating an original state of a protective sleeve of a hinge component according to some embodiments of the present disclosure.
Figure 8:
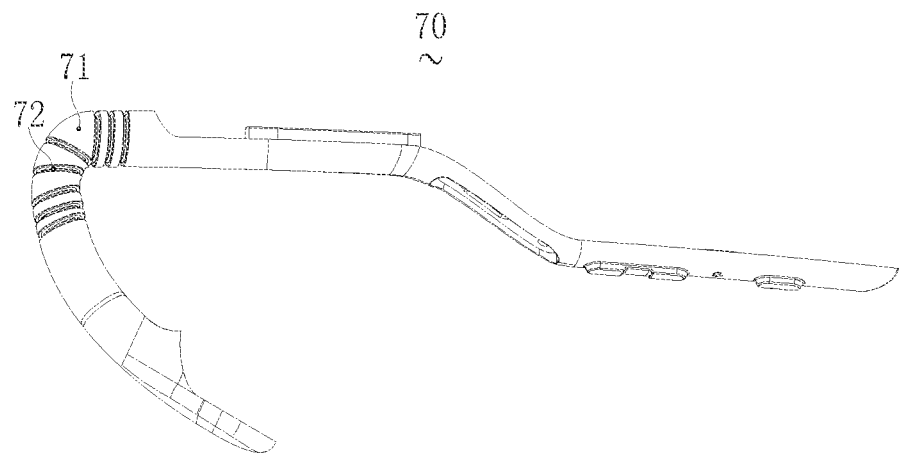
FIG. 8 is a diagram illustrating a bent state of a protective sleeve of a hinge component according to some embodiments of the present disclosure.
Figure 9:
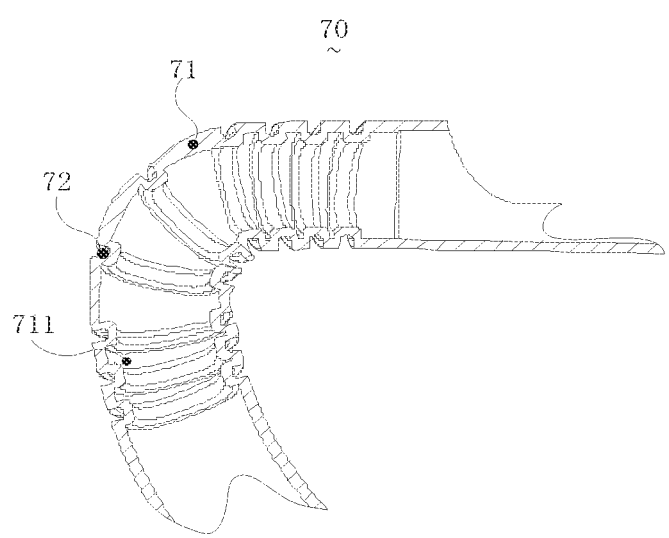
FIG. 9 is a partial sectional view illustrating a bent state of a hinge component protection sleeve according to some embodiments of the present disclosure.

Further referring to FIG. 2, and FIG. 6 to FIG. 9, FIG. 6 is a diagram illustrating an original state of a protective sleeve of a hinge component according to one embodiment of the present disclosure. FIG. 7 is a partial sectional view illustrating an original state of a protective sleeve of a hinge component according to an embodiment of the present disclosure. FIG. 8 is a diagram illustrating a bent state of a protective sleeve of a hinge component according to an embodiment of the present disclosure. FIG. 9 is a partial sectional view illustrating a folded state of a protective sleeve of a hinge component according to one embodiment of the present disclosure. In the embodiment, the hinge component 122 may also include a protective sleeve 70.

Specifically, the protective sleeve 70 may be disposed on the periphery of the hinge 30 and bent along with the hinge 30. In some embodiments, the protective sleeve 70 may include a plurality of annular ridge portions 71 spaced apart along the length direction of the protective sleeve 70 and annular connection portions 72 disposed between the annular ridge portions 71 and used to connect each two adjacent annular ridge portions. In some embodiments, the tube wall thickness of the annular ridge portion 71 may be greater than the tube wall thickness of the annular connection portion 72.

In some embodiments, the length direction of the protection sleeve 70 may be consistent with the length direction of the hinge 30. The protection sleeve 70 may be disposed along the length direction of the hinge mount 31 and the hinge arm 32. The protective sleeve 70 may be made of a soft material, such as soft silicone, rubber, etc.

The outer sidewall of the protective sleeve 70 may protrude outwardly to form the annular ridge portion 71. The shape of the inner sidewall of the protective sleeve 70 corresponding to the annular ridge portion 71 may not be specifically limited herein. For example, the inner wall may be smooth, or a recession may be disposed on the position of the inner wall corresponding to the annular ridge portion 71.

The annular connection portion 72 may be used to connect the adjacent annular ridge portions 71, specifically connected to an edge region of the annular ridge portion 71 near the inside of the protective sleeve 70. Therefore, the annular connection portion 72 may recess relative to the annular ridge portion 71 at a side of the outer wall of the protective sleeve 70.

Specifically, the count of the annular ridge portions 71 and the count of the annular connection portions 72 may be determined according to actual use conditions, for example, according to the length of the protective sleeve 70, the width of the annular ridge 71 and the width of the annular connection portion 72 in the longitudinal direction of the protective sleeve 70, or the like.

Further, the tube wall thickness of the annular ridge portion 71 and the tube wall thickness of the annular connection portion 72 refer to the thickness between the inner wall and the outer wall of the protective sleeve 70 corresponding to the annular ridge portion 71 and the annular connection portion 72, respectively. In the embodiment, the tube wall thickness of the annular ridge portion 71 may be greater than the tube wall thickness of the annular connection portion 72.

It should be easily understood when the hinge mount 31 and the hinge arm 32 of the hinge 30 are relatively rotated around the rotating shaft 33, the angle between the hinge mount 31 and the hinge arm 32 may change so that the protective sleeve 70 is bent as shown in FIGS. 8 and 9. Specifically, when the protective sleeve 70 is bent with the hinge 30, the annular ridge portion 71 and the annular connection portion 72 located in an outer region of the bent shape formed by the protective sleeve 70 may be in a stretched state, while the annular ridge portion 71 and the annular connection portion 72 located in an inner region of the bent shape may be in a compressed state.

In the embodiment, the tube wall thickness of the annular ridge portion 71 may be greater than the tube wall thickness of the annular connection portion 72. Therefore, the annular ridge portion 71 may be more rigid than the annular connection portion 72. Therefore, when the protective sleeve 70 is in the bent state, the protective sleeve 70 at the outer side of the bent shape may be in the stretched state. The annular ridge portion 71 may provide a strength support for the protective sleeve 70. At the same time, a region of the protective sleeve 70 at the inner side in the bent state may be compressed. The annular ridge portion 71 may also withstand a compression force, thereby protecting the protective sleeve 70, improving the stability of the protective sleeve 70, and extending the life of the protective sleeve 70.

Further, it should be noted that the shape of the protective sleeve 70 may be consistent with the state of the hinge 30.

In one application scenario, both sides of the protective sleeve 70 along the length direction and rotating around the rotating shaft may be stretched or compressed. In another application scenario, the hinge mount 31 and the hinge arm 32 of the hinge 30 may rotate around the rotating shaft 33 only within a range less than or equal to 180 degree. That is, the protective sleeve 70 may only be bent toward one side. One side of the two sides of the protective sleeve 70 in the length direction may be compressed, and the other side may be stretched. At this time, according to different forces on the two sides of the protective sleeve 70, the two sides of the protective sleeve 70 under the different forces may have different structures.

In one embodiment, when the protective sleeve 70 is in the bent state, the width of the annular ridge portion 71 along the longitudinal direction of the protective sleeve 70 toward the outer side of the bent shape formed by the protective sleeve 70 may be greater than the width along the length of the protective sleeve 70 towards the inside of the bent shape.

In some embodiments, an increment of the width of the annular ridge portion 71 along the length direction of the protective sleeve 70 may further increase the strength of the protective sleeve. Meanwhile, in the embodiment, an original included angle between the hinge mount 31 and the hinge arm 32 may be less than 180 degree. At this time, if the annular ridge portions 71 of the protective sleeve 70 are uniformly disposed, the protective sleeve 70 may be compressed in the original state. In the embodiment, the width of the annular ridge portion 71 corresponding to one side of the outer region of the bent shape in the bent state may be relatively large, so that the length of the side of the protective sleeve 70 may increase. Therefore, during the increment of the strength of the protective sleeve 70, a stretching degree of the stretching side may be reduced when the protective sleeve 70 is bent. At the same time, the width of the annular ridge portion 71 along the longitudinal direction of the protective sleeve 70 toward the side of the inner region of the bent shape may be relatively small when the protective sleeve 70 is in the bent state, which may increase a space of the compressed annular connection portion 72 in the length direction of the protective sleeve 70, and alleviate the compression of the compressed side.

Further, in an application scenario, the width of the annular ridge portion 71 may gradually decrease from the side of the outer region towards the bent shape to the side of the inner region towards the bent shape. Therefore, the width toward the side of the outer region of the bent shape formed by the protective sleeve 70 may be greater than the width toward the side of the inner region of the bent shape when the protective sleeve 70 is in the bent state.

It should be easily understood that the annular ridge portions 71 are disposed around the periphery of the protective sleeve 70. In the length direction of the protective sleeve 70, one side may correspond to the stretched side, and the other side may correspond to the compressed side. In the embodiment, the width of the annular ridge portion 71 may gradually decrease from the side of the outer region towards the bent shape to the side of the inner region towards the bent shape, so that the width may be more uniform, which may improve the stability of the protective sleeve 70.

In one embodiment, the annular ridge portion 71 may be disposed with a groove 711 on an inner ring surface inside the protective sleeve 70 at the side of the outer region of the bent shape formed by the protective sleeve 70 when the protective sleeve 70 is in the bent state.

Specifically, the groove 711 in the embodiment may be disposed along a direction perpendicular to the length direction of the protective sleeve 70. Therefore, the corresponding annular ridge portion 71 may be appropriately extended in the length direction when the protective sleeve 70 is stretched.

As described above, when the protective sleeve 70 is in the bent state, the protective sleeve 70 towards the outer side of the bent shape formed by the protective sleeve 70 may be in the stretched state. In the embodiment, the groove 711 may be further disposed on the inner ring surface inside the protective sleeve 70 corresponding to the corresponding annular ridge portion 71. Therefore, the annular ridge portion 71 corresponding to the groove 711 may be appropriately extended to bear a portion of the stretch when the protective sleeve is stretched at the side, thereby reducing a tensile force experienced by the protective sleeve at the side, and protecting the protective sleeve 70.

It should be noted that the inner wall of the protective sleeve 70 corresponding to the annular ridge portion 71 at the side towards the inner region of the bent shape may not be disposed with the groove 711 when the protective sleeve 70 is in the bent state. In an embodiment, the width of the groove 71 along the length of the protective sleeve 70 may gradually decrease from the side of the outer region towards the bent shape to the side of the inner region towards the bent shape. Therefore, no groove 711 may be disposed on the inner side wall of the protective sleeve 70 corresponding to the annular ridge portion 71 towards the inner region side of the bent shape.

Specifically, when the hinge component 122 in the embodiment is applied to the eyeglasses in the embodiment of the present disclosure described above, the protective sleeve 70 may be disposed on the main bodies 121 of the glass temples at both sides in the length direction of the protective sleeve 70, respectively, and connected to the function member 20. In an application scenario, the protective sleeve 70 may also be integrally formed as other structures of the eyeglasses, such as protective covers of some components, so that the eyeglasses may be more sealed and integrated.

It should be noted that the hinge component 122 in the embodiment of the present disclosure may not only be used in the eyeglasses in the embodiment of the present disclosure, but also be used in other devices. Moreover, the hinge component 122 may also include other components related to the hinge 30 other than the rod-shaped member 40, the fixing member 50, the connection wire 60, the protective sleeve 70, etc. to achieve corresponding functions.

Figure 10:
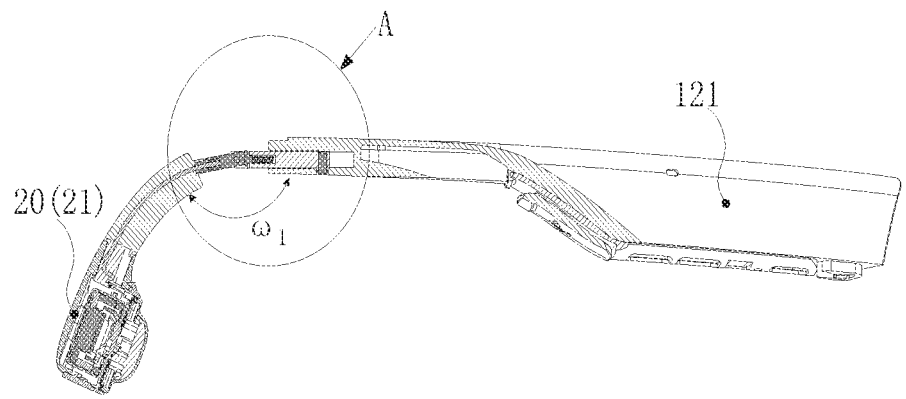
FIG. 10 is a partial sectional view illustrating eyeglasses according to some embodiments of the present disclosure.
Figure 11:
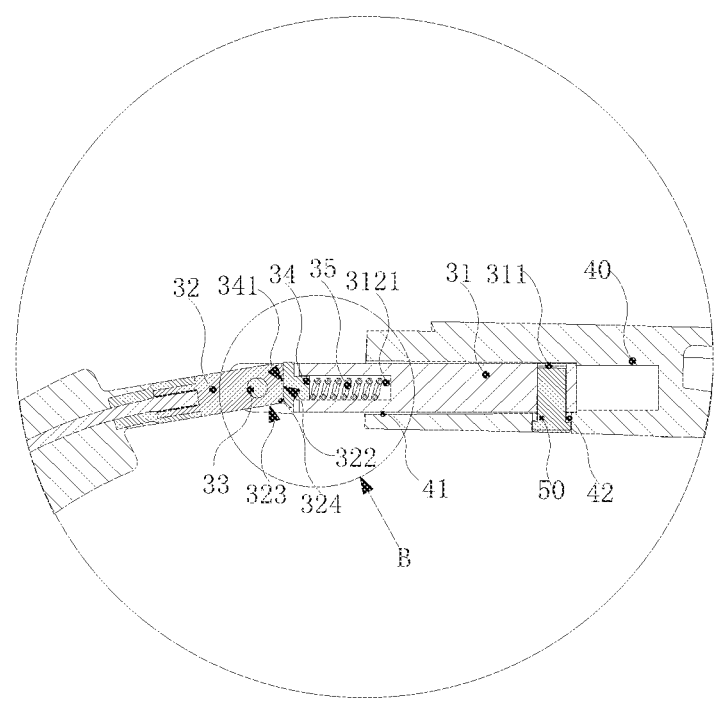
FIG. 11 is an enlarged view illustrating part A in FIG. 10 according to some embodiments of the present disclosure.
Figure 12:
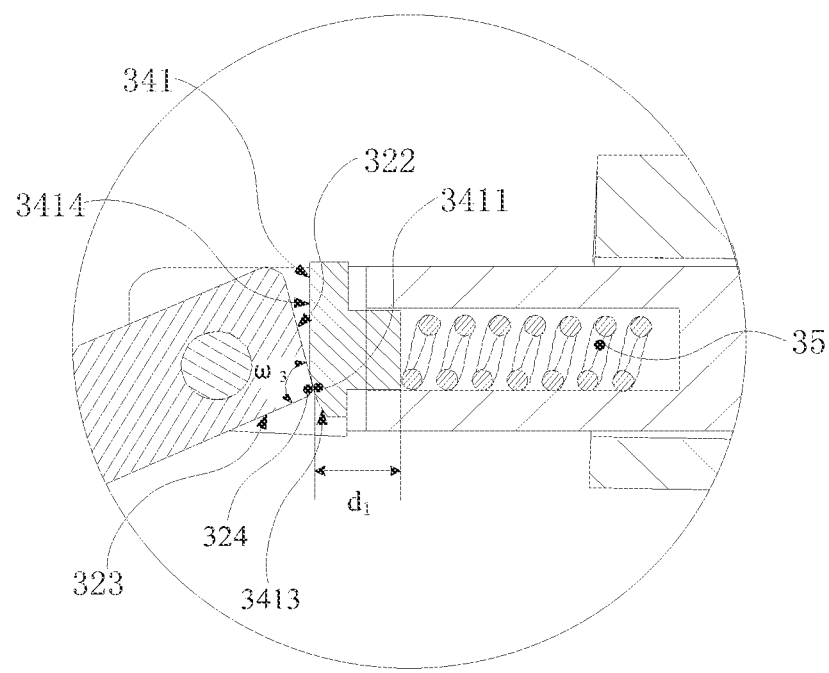
FIG. 12 is an enlarged view illustrating part B in FIG. 11 according to some embodiments of the present disclosure.
Figure 13:
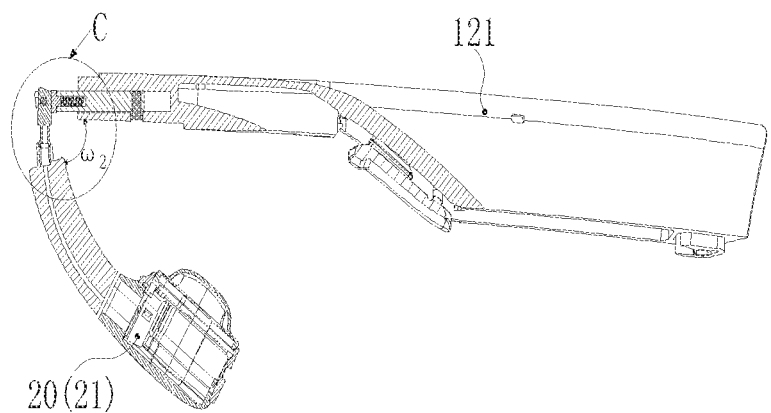
FIG. 13 is a partial sectional view illustrating eyeglasses according to some embodiments of the present disclosure.
Figure 14:
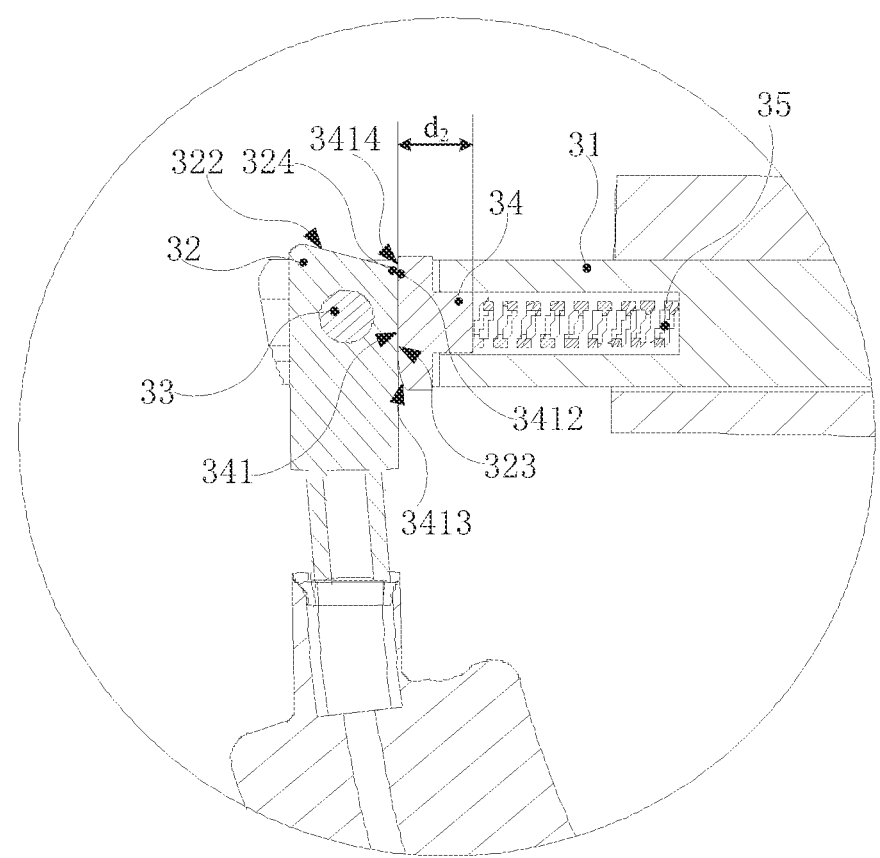
FIG. 14 is an enlarged view illustrating part C in FIG. 13 according to some embodiments of the present disclosure.

Specifically, referring to FIG. 10 to FIG. 14 together, FIG. 10 is a partial sectional view illustrating a hinge according to an embodiment of the present disclosure. FIG. 11 is an enlarged view illustrating part A in FIG. 10 according to some embodiments of the present disclosure. FIG. 12 is an enlarged view illustrating part B in FIG. 11 according to some embodiments of the present disclosure. Specifically, FIG. 12 shows an enlarged view illustrating part B in FIG. 11 when the abutting between a first support surface and a third support surface is changed to the abutting between a second support surface and the third support surface. Therefore, a connection between the first support surface and the second support surface initially touches the third support surface. FIG. 13 is a partial sectional view illustrating a hinge according to an embodiment of the present disclosure. FIG. 14 is an enlarged view illustrating part C in FIG. 13 according to some embodiments of the present disclosure. It should be noted that the hinge 30 in the embodiment of the present disclosure may be used in the eyeglasses in the embodiment of the present disclosure. The hinge 30 may be used in the hinge component 122 in the embodiments of the present disclosure, or used in other devices, and be not specifically limited herein.

In the embodiment, the hinge arm 32 of the hinge 30 may have a first support surface 322 and a second support surface 323 connected to each other.

The hinge 30 may also include a support member 34 and an elastic member 35. The support member 34 may be flexibly disposed on the hinge mount 31 and have a third support surface 341. The elastic member 35 may be used to elastically offset the support member 34 toward the hinge arm 32, so that the third support surface 341 may elastically abut on the first support surface 322 and the second support surface 323, respectively.

In some embodiments, when the hinge arm 32 is rotated relative to the hinge mount 31 under an external force, a connection 324 of the first support surface 322 and the second support surface 323 may drive the support member 34 against the elastic offset of the elastic member 35 to move in the opposite direction. Therefore, the third support surface 341 may be switched from elastically abutting on one of the first support surface 322 and the second support surface 323 to elastically abutting on the other of the first support surface 322 and the second support surface 323.

In an application scenario, the support member 34 may be connected to an end of the elastic member 35 towards the hinge arm 32. The third support surface 341 may face the side toward the hinge arm 32. In the process that the hinge arm 32 is rotated relative to the hinge mount 31 around the rotating shaft 33 under the external force, the third support surface 341 may be pushed so that the support member 34 may compress the elastic member 35. Further, the elastic offset may occur under the action of the elastic member 35. Of course, the elastic member 35 may be disconnected to the support member 34, and only abut on one side of the support member 34 as long as the support member 34 implements the elastic offset.

In some embodiments, the first support surface 322 and the second support surface 323 may be two side surfaces adjacent to the hinge arm 32 and at least partially parallel to the central axis of the rotating shaft 33, or a portion of the two side surfaces. When the hinge arm 32 rotates relative to the hinge mount 31, the first support surface 322 and the second support surface 323 may rotate with the hinge arm 32 around the rotating shaft 33. Therefore, different side surfaces of the hinge arm 32 may face the hinge mount 31. Thus, the hinge arm 32 may have different positions relative to the hinge mount 31.

In addition, the elastic member 35 may be a member that may provide an elastic force and be compressed in an elastic direction to provide a compression space. For example, the elastic member 35 may include a spring. One end of the spring may abut on the support member 34. When the third support surface 341 of support member 34 is pushed toward the elastic member 35, the elastic member 35 may be against the support member 34 and be compressed to provide a space in a direction that the third support surface 341 of the support member 34 faces. Therefore, when a relative position of the rotating shaft 33 is unchanged, there may be still enough space for different sides of the hinge arm 32 to rotate between the rotating shaft 33 and the third support surface 341.

Specifically, when the hinge arm 32 rotates relative to the hinge mount 31, the relative position of the rotating shaft 33 may be unchanged. A contact position of the hinge arm 32 and the third support surface 341 of the hinge mount 31 may change. Since distances between different positions of the hinge arm 32 and the rotating shaft 33 are different, the required space between the rotating shaft 33 and the contact position of the hinge arm 32 and the third support surface 341 may be different when different positions of the hinge arm 32 (e.g., different positions of the first support surface 322 and the second support surface 323) contact the third support surface 341. Due to the limitation of the elastic force and the space, the space provided by the compression of the elastic member 35 may be limited. Therefore, during the rotation of the hinge arm 32 relative to the hinge mount 31, if a distance between a position of the hinge arm 32 and the rotating shaft 33 is too large in a section perpendicular to the central axis of the rotating shaft 33, the position may be locked at another position of the third support surface during the rotation process, so that the hinge arm 32 may not continue to rotate. Therefore, the hinge arm 32 and the hinge mount 31 only rotates relatively within a range. In an application scenario, during the relative rotation between the hinge arm 32 and the hinge mount 31 around the rotating shaft 33, only the first support surface 322, the second support surface 323, and a region corresponding to the connection 324 between the first support surface 322 and the second support surface 323 may abut on the third support surface 341.

Further, in the embodiment, the first support surface 322 and the second support surface 323 may both be planes. A distance from the rotating shaft 33 to the connection 324 of the two support surfaces may be greater than a distance from the rotating shaft 33 to the first support surface 322 and a distance to the second support surface 323. The hinge 30 may have two relatively stable states that the third support surface 341 abuts on the first support surface 322 and the third support surface 341 abuts on the second support surface 323.

Of course, in the embodiment, the first support surface 322 and the second support surface 323 may also be curved surfaces with a radian or even include different sub-support surfaces, as long as a positional relationship between the hinge arm 32 and the hinge mount 31 may have at least two corresponding relatively stable states, and be not specifically limited herein. In addition, the hinge arm 32 may be disposed with more support surfaces. The hinge arm 32 and the hinge mount 31 may have various relative positional relationships by the different support surfaces elastically abutting on the third support surface 341 when the hinge arm 32 rotates relative to the hinge mount 31 around the rotating shaft 33 under an external force, and be not specifically limited herein.

Specifically, as shown in FIG. 11 and FIG. 12, an original state that the first support surface 322 abuts on the third support surface 341 of the support member 34 may be taken as an example. At this time, the elastic member 35 may have an elastic compression deformation, or be in an original natural state, and be not limited herein. When the hinge arm 32 rotates relative to the hinge mount 31 around the rotating shaft 33 under an external force of the hinge 30. Therefore, the second support surface 323 gradually approaches the third support surface 341, the connection 324 between the first support surface 322 and the second support surface 323 may touch the third support surface 341. Since the distance from the connection 324 to the rotating shaft 33 may be greater than the distance from the first support surface 322 to the rotating shaft 33, the connection 324 may abut on the support member 34 and push the support member 34 move toward the elastic member 35, thereby allowing the elastic member 35 against the pull to compress. When the hinge arm 32 is further stressed, the connection 324 may gradually approach a region between the rotating shaft 33 and the third support surface 341. In the process, the distance between the rotating shaft 33 and the third support surface 341 may gradually increase. It should be easily understood when a connection line between the connection 324 and the rotating shaft 33 is perpendicular to the third support surface 341, the distance from the rotating shaft 33 to the third support surface 341 may be equal to the distance from the rotating shaft 33 to the connection 324 in a section perpendicular to the central axis of the rotating shaft 33. At this time, the rotating shaft 33 may be farthest from the third support surface 341. At this time, if the force is continuously applied to the hinge 30, the distance from the rotating shaft 33 to the third support surface 341 may gradually become smaller, so that the required compression space of the elastic member 35 may be reduced. Then the elastic member 35 may gradually release the elastic force and recover until the connection 324 leaves the third support surface 341 and the second support surface 323 abuts on the third support surface 341, thereby switching from abutting the first support surface 322 on the third support surface 341 to abutting the second support surface 323 on the third support surface 341.

Similarly, the process (as shown in FIG. 13 and FIG. 14) for switching from an original state that the second support surface 323 abuts on the third support surface 341 of the support member 34 to a state that the first support surface 322 abuts on the third support surface 341 of the support member 34 may be similar to the above process.

It should be noted that the hinge 30 in the embodiment may be applied to the hinge component 122 of the eyeglasses in the embodiment of the present disclosure. When the third support surface 341 is switched from elastically abutting on one of the first support surface 322 and the second support surface 323 to elastically abutting on the other of the first support surface 322 and the second support surface 323, the hinge component 122 may drive the speaker 21 to switch between a first relatively fixing position and a second relatively fixing position relative to the main body 121 of the eyeglass temple. The hinge component 122 may fit on the back of an auricle of the user when the speaker 21 is in the first relatively fixing position. As used herein, the auricle may be a portion of an external ear and mainly composed of cartilage. In some embodiments, the speaker 21 may include a bone conduction speaker. By fitting the speaker to the back of the auricle, the cartilage of the auricle may be used to transmit bone conduction sound/vibration. The bone conduction speaker may be fitted to the back of the auricle, thereby improving the sound quality and reducing the impact on an ear canal during the sound transmission.

It should be noted that the distance from the rotating shaft 33 to the connection 324 may be greater than a vertical distance from the first support surface 322 and the second support surface 323. Therefore, in the process that the third support surface 341 is switched from elastically abutting on one of the first support surface 322 and the second support surface 323 to elastically abutting on the other of the first support surface 322 and the second support surface 323, the state of the hinge 30 may change abruptly.

The switch from elastically abutting between the first support surface 322 and the third support surface 341 to elastically abutting between the second support surface 323 and the third support surface 341 may be taken as an example. When a ratio between the maximum distance $h_1$ from the rotating shaft 33 to the connection 324 and the shortest distance $h_2$ from the rotating shaft 33 to the first support surface 322 is different, the change during the switching process may be different.

In one embodiment, the ratio between the maximum distance h1 from the rotating shaft 33 to the connection 324 and the shortest distance $h_2$ from the rotating shaft 33 to the first support surface 322 may be between 1.1 and 1.5 in the section perpendicular to the central axis of the rotating shaft 33.

Specifically, the maximum distance $h_1$ from the rotating shaft 33 to the connection 324 may be larger than the shortest distance $h_2$ of the rotating shaft 33 to the first support surface 322 by disposing the rotating shaft 33 away from the second support surface 323 and close to the side of the hinge arm 32 opposite to the second support surface 323, thereby satisfying the ratio described above.

It should be noted that the change may become obvious when the ratio between $h_1$ and $h_2$ is too large. However, a large force may be needed to switch from elastically abutting between the first support surface 322 and the third support surface 341 to elastically abutting between the second support surface 323 and the third support surface 341, thereby causing inconvenience. If the ratio between $h_1$ and $h_2$ is too small, although it is easier to switch the state, the change may be small. For example, when the user pulls the hinge 30, there may be no obvious feeling of pulling the hinge 30, causing inconvenience. In the embodiment, the ratio of $h_1$ to $h_2$ may be set between 1.1 and 1.5, and the hinge 30 may have a more obvious change when the third support surface 341 is switched from elastically abutting on the first support surface 322 to elastically abutting on the second support surface 323. Thus, during use, the user may have a relatively obvious feeling of pulling the hinge 30. At the same time, the change may not be too abrupt to making it difficult for the user to switch the state of the hinge 30.

In an application scenario, the ratio of $h_1$ to $h_2$ may also be between 1.2 and 1.4. Specifically, the ratio of $h_1$ to $h_2$ may also be 1.1, 1.2, 1.3, 1.4, 1.5, etc., and be not specifically limited herein.

In addition, the positions of the first support surface 322 and the second support surface 323 set on the hinge arm 32 may affect the included angle between the hinge arm 32 and the hinge mount 31 when the third support surface 341 abuts on one of the first support surface 322 and the second support surface 323. Therefore, the positions of the first support surface 322 and the second support surface 323 on the hinge arm 32 may be set differently according to specific user requirements. In some embodiments, the included angle between the hinge arm 32 and the hinge mount 31 may be specifically shown in FIG. 9 and FIG. 12. ω1 may be the included angle between the hinge arm 32 and the hinge mount 31 when the third support surface 341 abuts on the first support surface 322. ω2 may be the included angle between the hinge arm 32 and the hinge mount 31 when the third support surface 341 abuts on the second support surface 323. In one embodiment, each of the hinge arm 32 and the hinge mount 31 may have a length. The hinge arm 32 may be disposed on one end side of the hinge mount 31 in the length direction. The first support surface 322 may be disposed at the end of the hinge arm 32 near the hinge mount 31 in the length direction. The second support surface 323 may be disposed at one end in the width direction of the hinge arm 32 and parallel to the central axis of the rotating shaft 33. At this time, when the third support surface 341 elastically abuts on the first support surface 322, the included angle between the hinge arm 32 and the hinge mount 31 may be the largest. When the third support surface 341 elastically abuts on the second support surface 323, the included angle between the hinge arm 32 and the hinge mount 31 may be the smallest. Therefore, the included angle between the hinge mount 31 and the hinge arm 32 may be changed from ω1 to ω2 and become smaller when the third support surface 341 is switched from elastically abutting on the first support surface 322 to elastically abutting on the second support surface 323.

It should to be further noted if the direction of the force applied to the hinge arm 32 is the same as the direction of the gravity of the hinge arm 32 when the third support surface 341 is switched from elastically abutting on the first support surface 322 to elastically abutting on the second support surface 323, the switching in this state may make the included angle between the hinge mount 31 and the hinge arm 32 smaller. The setting of the ratio between the $h_1$ and $h_2$ in the embodiment may also make the hinge arm 32 not or hardly reduce the angle between the hinge arm 32 and the hinge mount 31 spontaneously due to the own gravity when the third support surface 341 elastically abut on the first support surface 322.

In an embodiment of a hinge in the present disclosure, referring to FIG. 12, the included angle $ω_3$ between the first support surface 322 and the second support surface 323 may be an obtuse angle in a section perpendicular to the central axis of the rotating shaft 33.

In some embodiments, when the hinge 30 switches from the state of elastically abutting between the first support surface 322 and the third support surface 341 to the state of elastically abutting between the second support surface 323 and the third support surface 341, the smaller the included angle $ω_3$ between the first support surface 322 and the second support surface 323, the larger the relative rotation angle between the hinge mount 31 and the hinge arm 32 may be when the state is switched. That is, when the hinge mount 31 is fixed, the user may need to move the hinge arm 32 to a larger angle to switch the state of the hinge 30, so that the user may be laborious and it may bring inconvenience to the user.

Since the hinge arm 32 has a length, and the first support surface 322 is disposed at one end in the length direction of the hinge arm 32, the second support surface 323 may be disposed adjacent to the first support surface 322 in the width direction of the hinge arm 32. Normally, the first support surface 322 and the second support surface 323 may be arranged vertically. At this time, when the hinge 30 is switched between the two states, the hinge arm 32 and the hinge mount 31 may need to be moved relative to each other by 90 degree.

In the embodiment, in the section perpendicular to the central axis of the rotating shaft 33, the included angle $ω_3$ between the first support surface 322 and the second support surface 323 may be an obtuse angle. Thus, the angle required for the relative movement of the hinge arm 32 and the hinge mount 31 may be less than 90 degree when the hinge 30 switches between the two states, which may facilitate the user.

Specifically, when the hinge 30 in the embodiment is used in the embodiment of the eyeglasses in the present disclosure, the hinge 30 may be used to connect the main body 121 of the eyeglass temple and the speaker 21. In some embodiments, the speaker 21 may be a bone conduction speaker. For example, when the hinge 30 is in a second state of elastically abutting between the second support surface 323 and the third support surface 341, the speaker 21 may be in the first relatively fixing position to fit the back of the auricle of the user. Therefore, when the user needs to use the function of the speaker 21 of the eyeglasses, the user may only need to rotate the speaker 21 by an angle less than 90 degree to fit it to the back of the auricle of the user. In addition, when the hinge 30 is in a first state of elastically abutting between the first support surface 322 and the third support surface 341, the hinge arm 32 and the connected speaker 21 may form an angle. Therefore, the hinge arm 32 and the connected speaker 21 may be located behind an ear of the user and face the direction of the ear of the user when the user wears the eyeglasses. Therefore, the eyeglasses may be blocked and fixed, and prevented from falling off the head of the user.

It should be noted that the included angle $\omega_3$ between the first support surface 322 and the second support surface 323 may be set according to actual requirements. If the included angle is too large, the included angle between the hinge arm 32 and the hinge mount 31 and the angle between the function member 20 connected to the end of the hinge arm 32 away from the hinge mount 31 and the hinge mount 31 may be smaller. Therefore, the hinge arm 32 and the function member 20 may be too close to the ears of the user to compress the ears when the user wears it, reducing the comfort of the user. If the included angle is too small, on the one hand, the required angle may be too large, which is inconvenient for the user when the user moves the speaker 21 to switch between the first relative position and the second relative position. On the other hand, the included angle between the main body 121 of the eyeglass temple and the hinge 30 and the included angle between the main body 121 of the eyeglass temple and the speaker 21 may be too small to play a role in blocking and fixing the eyeglasses. Therefore, the eyeglasses may be easily dropped from the front side of the head of the user when the user wears the eyeglasses. Specifically, the included angle between the first support surface 322 and the second support surface 323 may be set according to the shape of the head of the user.

Specifically, in an application scenario, in the section perpendicular to the central axis of the rotating shaft 33, the included angle $\omega_3$ between the first support surface 322 and the second support surface 323 may be between 100 degree and 120 degree, and specifically be 100 degree, 110 degree, 120 degree, or the like. The setting of the angle may enable the user to wear the eyeglasses, and the speaker 21 may not be too close to the ears of the user to cause discomfort to the ears of the user when the speaker 21 is in the first relatively fixing position. It may be unnecessary to rotate the hinge by an excessive angle upon switching between the two relative positions of the speaker 21, which is convenient for users.

In some embodiments, in the process that the third support surface 341 is switched from elastically abutting on one of the first support surface 322 and the second support surface 323 to elastically abutting on the other of the first support surface 322 and the second support surface 323, the connection 324 between the first support surface 322 and the second support surface 323 may abut on the third support surface 341, and drive the support member 34 against the elastic offset of the elastic member 35 to move in the opposite direction. Elastically abutting between the third support surface 341 and the first support surface 322 before the switching may be taken as an example. At the start of the switching, while the first support surface 322 gradually moves away from the third support surface 341, the connection 324 may gradually abut on the third support surface 341 and slide from one side of the third support surface 341 to another side of the third support surface 341 during the switching process. Finally, the second support surface 323 and the third support surface 341 may further turn to elastically abut. During the state switching process, the connection 324 may always abut on and interact with the third support surface 341. The shape of the connection 324 may have an effect on the state switching process. For example, if the first support surface 322 and the second support surface 323 are line-connected, the connection 324 may have a relatively sharp angle. Therefore, during the user pulls the hinge mount 31 and/or the hinge arm 32 to switch the state of the hinge 30, on the one hand, the buffer may be small and the switching may be abrupt upon switching from abutting between the connection 324 and the third support surface 341 to abutting between the connection 324 and the first support surface 322 and the second support surface 323. Thus the feeling of moving the hinge 30 may be poor. On the other hand, the connection 324 may be relatively sharp, which may cause wear to the third support surface 341 during repeated switching processes.

In one embodiment of the present disclosure, in a section perpendicular to the central axis of the rotating shaft 33, the connection 324 may have a shape of an arc. As a result, the connection between the first support surface 322 and the second support surface 323 may be a connection with an arc surface. During the state switching process of the hinge 30, the connection 324 abutting on the third support surface 341 may be relatively smooth, so that the user may have a better feeling of pulling the hinge 30. The damage to the third support surface 341 may be reduced during repeated switching processes.

Specifically, in one embodiment, the connection 324 may have a shape of a circular arc. If a curvature of the arc is different, effects brought by the curvatures may be different. The curvature may be set in combination with actual use situations. The curvature of the arc in the embodiment may be between 5 and 30, and specifically 5, 10, 15, 20, 25, 30, etc., and be not limited herein.

It should be noted when the hinge 30 in the embodiment is applied to the eyeglasses in the embodiment described above, the circular arc shape of the curvature of the connection 324 may enable the user to have a better feel when the hinge 30 is pulled to drive the speaker to switch between the first relatively fixing position and the second relatively fixing position.

In one embodiment, the third support surface 341 may be set so that the external force required when the third support surface 341 is switched from elastically abutting on the first support surface 322 to elastically abutting on the second support surface 323 may be different from the external force required when the third support surface 341 is switched from elastically abutting on the second support surface 323 to elastically abutting on the first support surface 322.

It should be noted that, in a specific use scenario, different states of the hinge 30 may correspond to different functions of the hinge 30 or structures connected to the hinge 30. Alternatively, due to a setting problem of the position of the hinge 30, it may not be convenient for the user to exert a force to switch from one state to another. When the user switches the state of the hinge 30, it may be necessary to distinguish the strength of pulling the hinge 30 to facilitate the user to exert the force, or to provide the user with an intuitive experience to distinguish the two hinge states.

Specifically, when the hinge 30 in the embodiment is applied to the eyeglasses, the state switching of the hinge 30 may drive the speaker 21 to switch between the first relatively fixing position and the second relatively fixing position relative to the main body 121 of the eyeglass temple. Correspondingly, the two relatively fixing positions may correspond to two situations where the user uses the speaker 21 and where the user does not use the speaker 21. When the user wears the eyeglasses, difficulty of applying forces to the back of the head to switch between the two states may be different. Therefore, the design of applying different external forces to correspondingly switching between different states may facilitate the usage of the user.

Specifically, in an embodiment, when the third support surface 341 is switched from elastically abutting on the first support surface 322 to elastically abutting on the second support surface 323, the speaker 21 may move from the second relatively fixing position to the first relatively fixing position so as to fit the back of the auricle of the user.

Further, in the embodiment, the third support surface 341 may be set such that the external force required when the third support surface 341 is switched from elastically abutting on the first support surface 322 to elastically abutting on the second support surface 323 may be less than the external force required when the third support surface 341 is switched from elastically abutting on the second support surface 323 to elastically abutting on the first support surface 322.

It should be noted when the speaker 21 is used, the third support surface 341 may need to be switched from elastically abutting on the first support surface 322 to elastically abutting on the second support surface 323 upon being applied to the eyeglasses. When the speaker 21 is not used, the third support surface 341 may need to be switched from elastically abutting on the second support surface 323 to elastically abutting on the third support surface 341. According to the embodiment, the force required when the user uses the speaker 21 may be less than the force required when the speaker 21 is not used. Therefore, it may be convenient for the user to use the function of the speaker 21 of the eyeglasses.

Specifically, referring to FIG. 12 and FIG. 14 together, in an application scenario, when the third support surface 341 is switched from elastically abutting on the first support surface 322 to elastically abutting on the second support surface 323, the connection 324 may initially contact a first position 3411 of the third support surface 341. When the third support surface 341 is switched from t elastically abutting on the second support surface 323 to elastically abutting on the first support surface 322, the connection 324 may initially contact a second position 3412 of the third support surface 341. In some embodiments, in a section perpendicular to the central axis of the rotating shaft 33, a distance d1 between the first position 3411 and a contact point of the elastic member 35 and the support member 34 along the direction of the elastic offset of the elastic member 35 may be less than a distance d2 between the second position 3412 and the contact point in the direction of the elastic offset.

It should be noted when the third support surface 341 elastically abuts on the first support surface 322, the connection 324 may be located near a position of one end of the third support surface 341. When the third support surface 341 elastically abuts on the second support surface 323, the connection 324 may be located near a position of another end of the third support surface 341. Therefore, the first position 3411 and the second position 3412 may be located near the two ends of the third support surface 341, respectively. That is, in the embodiment, a distance between the positions of the third support surface 341 of the support member 34 near the two ends may be different from a distance between the elastic member 35 and the contact point of the support member 34 in the direction of the elastic offset of the elastic member 35. The distance corresponding to the second position 3412 may be less than the distance corresponding to the first position 3411. At this time, when the third support surface 341 is switched from elastically abutting on the first support surface 322 to elastically abutting on the second support surface 323, the connection 324 may not immediately abut on the third support surface 341 and receive a reaction force of the elastic member 35, but gradually abut on the third support surface 341 and receive the reaction force of the elastic member 35 during the switching process. When the third support surface 341 is switched from elastically abutting on the first support surface 322 to elastically abutting on the second support surface 323, the connection 324 may initially abut on the third support surface 341 and receive the reaction force of elastic member 35, or at least receive the reaction force of elastic member 35 earlier than that the third support surface 341 is switched from elastically abutting on the second support surface 323 to elastically abutting on the first support surface 322. Therefore, in this case, the hinge 30 may need a smaller force to switch from elastically abutting on the first support surface 322 to elastically abutting on the second support surface 323. Therefore, the force required to move the speaker 21 may be small when the user uses the speaker 21, which is convenient for the user.

Further, the third support surface 341 may include a first sub-support surface 3413 and a second sub-support surface 3414. In some embodiments, the first position 3411 may be disposed on the first sub-support surface 3413. The second position 3412 may be disposed on the second sub-support surface 3414. That is, the first sub-support surface 3413 and the second sub-support surface 3414 may be disposed near the two ends of the third support surface 341, respectively.

In some embodiments, the second sub-support surface 3414 may be a plane. Specifically, when the first support surface 322 or the second support surface 323 elastically abuts on the third support surface 341, the second sub-support surface 3414 may be parallel to the first support surface 322 or the second support surface 323. The first sub-support surface 3413 may be a flat surface or a curved surface, and be not limited herein.

Further, the first sub-support surface 3413 and the second sub-support surface 3414 may not be located in the same plane. The first sub-support surface 3413 may be inclined relative to the second sub-support surface 3414. An included angle between the two sub-support surfaces may be no greater than 10 degree, for example, no greater than 2 degree, 4 degree, 6 degree, 8 degree, 10 degree, etc. Specifically, the first sub-support surface 3413 may be disposed in a direction away from the hinge arm 32. Therefore, in the section perpendicular to the central axis of the rotating shaft 33, the distance between the first position 3411 and the elastic member 35 and the distance between the first position 3411 and the contact point of the elastic member 35 in the direction of the elastic offset of the elastic member 35 may be less than the distance between the second position 3412 and the contact point in the direction of the elastic offset. In some embodiments, when the first sub-support surface 3413 is a curved surface and the second sub-support surface 3414 is a flat surface, the included angle between the first sub support surface 3413 and the second sub-support surface 3414 may be an included angle between a plane tangent to the first sub support surface 3413 and the second sub support surface 3414 at the intersection of the two sub-support surfaces.

Figure 15:
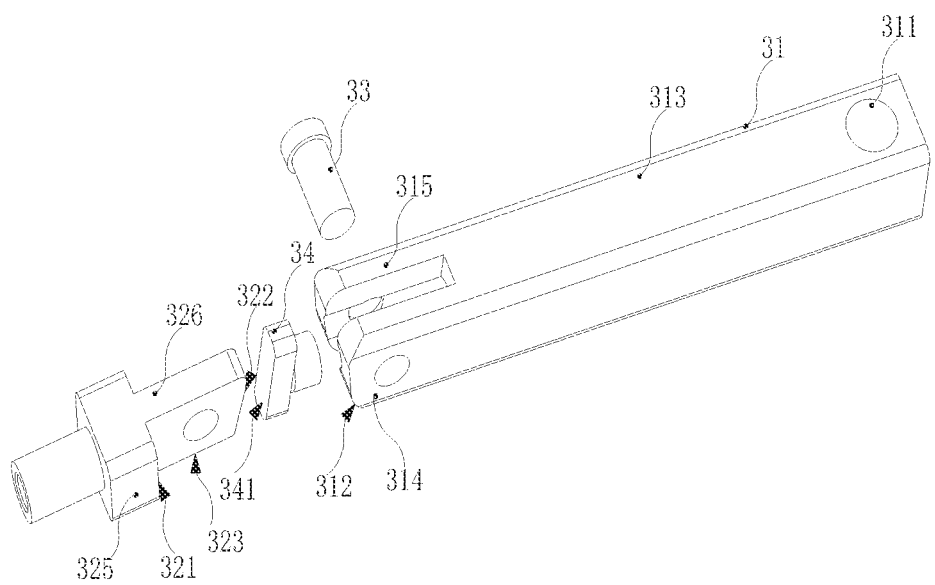
FIG. 15 is an exploded structural diagram illustrating eyeglasses according to some embodiments of the present disclosure.

Referring to FIG. 15, FIG. 15 is an exploded structural diagram illustrating a hinge according to an embodiment of the present disclosure. In the embodiment, the hinge mount 31 may include a mount body 313, and a first lug 314 and a second lug 315 protruding from the mount body 313 and spaced from each other. The hinge arm 32 may include an arm body 325 and a third lug 326 protruding from the arm body 325. The third lug 326 may be inserted into an interval region between the first lug 314 and the second lug 315, and rotatably connected to the first lug 314 and the second lug 315 via the rotating shaft 33. The first support surface 322 and the second support surface 323 may be disposed on the third lug 326. The support member 34 may be at least partially disposed in the interval region and located at the side of the third lug 326 towards the mount body 313. The mount body 313 may be disposed with an accommodation chamber 3121 communicating with the interval region. The elastic member 35 may be disposed inside the accommodation chamber 3121, and allow the support member 34 elastically offset towards the third lug 326.

Specifically, corresponding positions of the first lug 314, the second lug 315, and the third lug 326 may be respectively disposed with a first through-hole, a second through-hole, and a third through-hole located in a same axial direction. Inner diameters of the three through-holes may be no less than the outer diameter of the rotating shaft 33. Thus, when the rotating shaft 33 passes through a corresponding through-hole, the hinge mount 31 where the first lug 314 and the second lug 315 are located may be rotatably connected to the hinge arm 32 where the third lug 326 is located.

In some embodiments, the first support surface 322 and the second support surface 323 may be both disposed on the third lug 326 and parallel to the central axis of the rotating shaft 33. Therefore, the first support surface 322 and the second support surface 323 may enter the interval region between the first lug 314 and the second lug 315 when the hinge arm 32 rotates around the rotating shaft 33 relative to the hinge mount 31.

Further, the support member 34 may be located between the first lug 314 and the second lug 315 of the mount body 313. The third support surface 341 of the support member 34 may be disposed toward the third lug 326. In one application scenario, the elastic member 35 may be completely set inside the accommodation chamber 3121, and touch the support member 34 at the side towards the interval region between the first lug 314 and the second lug 315. When the elastic member 35 is in a natural state, a region of the support member 34 near the elastic member 35 may be at least partially located inside the accommodation chamber 3121. It should be noted that the shape of the portion of the support member 34 inside the accommodation chamber 3121 may match the shape of the accommodation chamber 3121. Therefore, the portion of the support member 34 located inside the accommodation chamber 3121 may stably slide inside the accommodation chamber 3121 when the support member 34 is elastically offset via the elastic member 35.

In an application scenario, a sectional area of the accommodation chamber 3121 may be less than a sectional area of the interval region between the first lug 314 and the second lug 315 in a section perpendicular to the length direction of the hinge mount 31. The shape of the support member 34 region outside the accommodation chamber 3121 may match the interval region. Therefore, the support member 34 may not all enter the accommodation chamber 3121 upon moving toward a side of the elastic member 35.

Of course, in other embodiments, the sectional shape of the accommodation chamber 3121 may be the same as the interval region between the first lug 314 and the second lug 315 in the section perpendicular to the length direction of the hinge mount 31. At this time, the support member 34 may completely enter the accommodation chamber 3121. Therefore, the support member 34 may slide inside the entire accommodation chamber 3121 upon receiving a pushing force.

Further, when the hinge 30 in the embodiment is applied to the hinge component 122 in the embodiment of the hinge component in present disclosure, the first end surface 312 of the hinge mount 31 may be an end surface of the first lug 314 and the second lug 315 toward the hinge arm 32. The third lug 326 facing a protrusion toward the arm body 325 may be located inside the interval region between the first lug 314 and the second lug 315. Therefore, the first end surface 312 of the first lug 314 and the second lug 315 may be disposed toward the arm body 325. In a section of the central axis direction of the rotating shaft 33, the arm body 325 may be further protruded from the third lug 326 to form a second end surface 321 of the first lug 314 and the second lug 315 toward the hinge mount 31.

In the embodiment, during the relative rotation of the hinge arm 32 and the hinge mount 31, a gap between the first end surface 312 of the first lug 314 and the second lug 315 and the second end surface 321 of the arm body 325 may always be larger or smaller than the diameter of the connection wire 60. Therefore, the connection wire 60 may not be sandwiched between the first lug 314 and the second lug 315 and the arm body 325 during the relative rotation of the hinge mount 31 and the hinge arm 32, thereby reducing the damage of the connection wire 60 by the hinge 30.

In an application scenario, the gap between the second end surface 321 of the first lug 314 and the second lug 315 and the first end surface 312 of the arm body 325 may always be kept much larger or smaller than the diameter of the connection wire 60 during the relative rotation of the hinge arm 32 and the hinge mount 31, thereby further reducing the damage of the connection wire 60 by the hinge 30.

It should be noted that, in the embodiment, the gap between the first end surface 312 and the second end surface 321 may be a gap with even size, thereby satisfying the above condition of being greater than or less than the diameter of the connection wire 60. Alternatively, in another embodiment, only gaps of positions at both end surfaces close to the connection wire 60 may be greater than or less than the diameter of the connection wire 60. Gaps of other positions at both end surfaces may not need to satisfy the condition.

Specifically, in an application scenario, in a section perpendicular to the central axis of the rotating shaft 33, at least one of an end surface of the first lug 314 and the second lug 315 towards the hinge arm 32 and an end surface of the arm body 325 towards the hinge mount 31 may be in a chamfer setting. Therefore, during the relative rotation of the hinge arm 32 and the hinge mount 31, the positions close to the connection wire 60 may always be kept larger than the diameter of the connection wire 60.

In some embodiments, the chamfer setting may be filleted, or directly chamfered.

In the application scenario, it may be only necessary to chamfer at least one of the end surface of the first lug 314 and the second lug 315 near the connection wire 60 towards the hinge arm 32 and the end surface of the arm body 325 towards the hinge mount 31. Therefore, during the relative rotation of the hinge arm 32 and the hinge mount 31, the connection wire 60 may not be clamped into the gap between the two end surfaces.

The hinge in the embodiment of the present disclosure may be applied to the embodiment of the hinge component in the present disclosure, and not be limited herein. In other embodiments, it may also be applied to other hinge components, or a direct connection of two components that need to be rotatably connected.

It should be noted that the above description of the hinge component of the eyeglasses is only a specific example, and should not be regarded as the only feasible implementation solution. Obviously, for those skilled in the art, after understanding the basic principle of the hinge component of eyeglasses, it may be possible to make various modifications and changes in the form and details of the specific method and operation of implementing the hinge component of the eyeglasses without departing from these principles, but these modifications and changes are still within the scope described above. For example, the sectional shape of the hinge mount 31 and the hinge chamber 41 may be circular, oval, trapezoidal, or the like. All such variations may be within the protection scope of the present disclosure.

Figure 16:
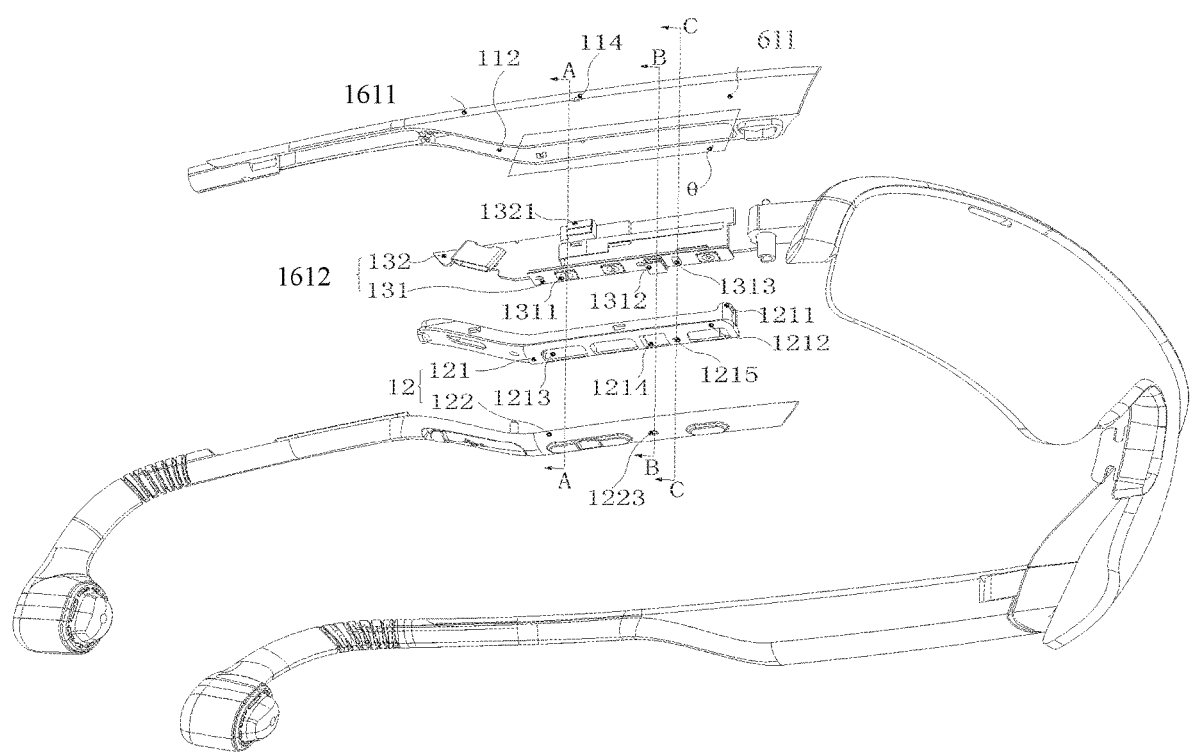
FIG. 16 is an exploded structural diagram illustrating eyeglasses according to some embodiments of the present disclosure.
Figure 17:
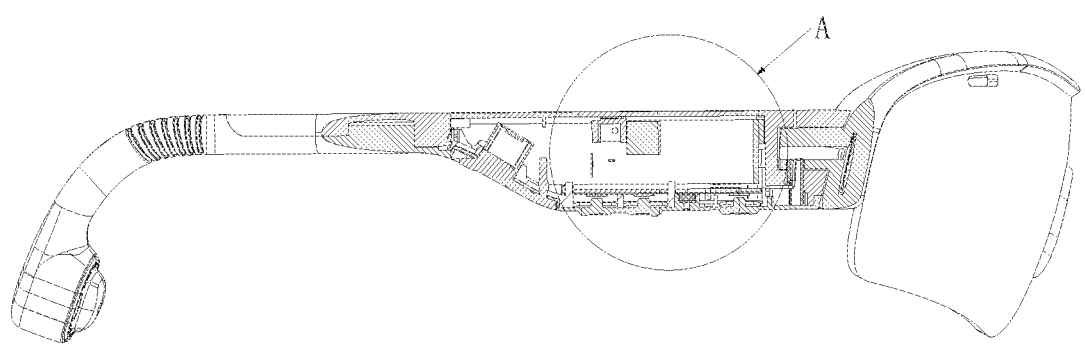
FIG. 17 is a partial sectional view illustrating eyeglasses according to some embodiments of the present disclosure.
Figure 18:
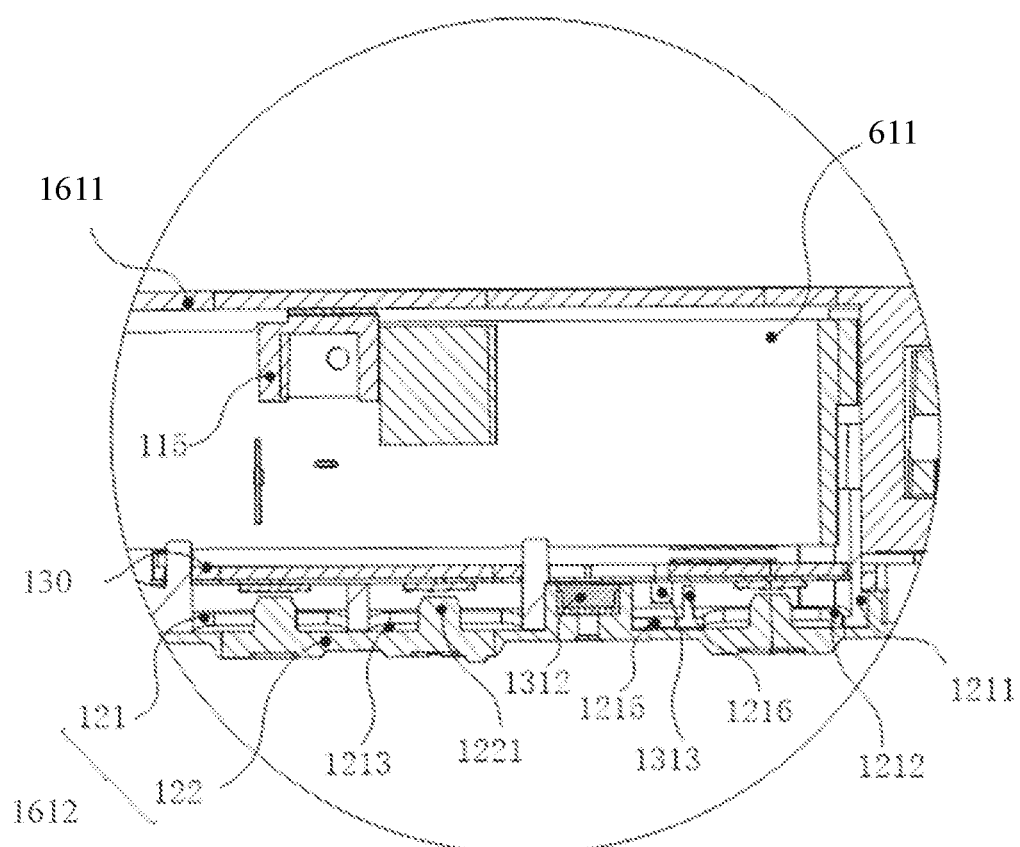
FIG. 18 is an enlarged view illustrating part A in the FIG. 17 according to some embodiments of the present disclosure.

FIG. 16 is an exploded structural diagram illustrating an electronic component according to some embodiments of the present disclosure. FIG. 17 is a partial sectional view illustrating an electronic component according to some embodiments of the present disclosure. FIG. 18 is an enlarged view illustrating part A in FIG. 17 according to some embodiments of the present disclosure. The electronic component in the present disclosure may be applied to an electronic device. As used herein, the electronic device may be any electronic device that requires to seal an inner structure, such as earphones, MP3 players, hearing aids, mobile phones, tablet computers, or eyeglasses with circuit components or electronic devices, etc., and be not specifically limited herein. In some embodiments, the electronic component may be disposed on the eyeglass temple 12 in FIG. 1. In some embodiments, the electronic component may also be referred to as a circuit housing.

Referring to FIG. 16, FIG. 17, and FIG. 18, in some embodiments, the electronic component (or referred to as the circuit housing) may include an accommodation body 1611 and a cover 16120. As used herein, the accommodation body 1611 may be disposed with a chamber 611 having at least one opening 112. The cover 16120 may be covered in the opening 112 of the chamber 611 and used to seal the chamber 611.

In some embodiments, the accommodation body 1611 may be at least a portion of the electronic device. Specifically, the accommodation body 1611 in the embodiment may be a structure for holding, for example, a circuit board, a battery, or an electronic component in the electronic device, the whole or a portion of the eyeglasses, etc. In some embodiments, the accommodation body 1611 may be disposed with the chamber 611 having the opening 112 for accommodating the circuit board, the battery, electronic components, or the like.

The shape of the cover 16120 may at least partially match the opening 112. Therefore, the cover 16120 may be placed on the opening 112 to seal the chamber 611. As used herein, the material of the cover 16120 may be different from or partially the same as the accommodation body 1611. In some embodiments, the cover 16120 may include a rigid bracket 121 and a soft cover layer 122. As used herein, the bracket 121 may be used to physically connect to the accommodation body 1611. The cover layer 122 may integrally form on the surface of the bracket 121 by injection molding to provide a seal for the chamber 611 after the bracket 121 is connected to the accommodation body 1611.

In some embodiments, the material of the bracket 121 may include hard plastic. The material of the cover layer 122 may include soft silicone or rubber. As used herein, the shape of one side of the bracket 121 towards the accommodation body 1611 may match the opening 112. The bracket 121 may be fixed to the opening 112 of the chamber 611 by means of plugging, buckling, etc., to be physically connected to the accommodation body 1611. A gap may easily form at a physical connection of the rigid bracket 121 and the accommodation body 11 and reduce the sealing of the chamber 611. Further, the soft cover layer 122 may integrally form on an outer surface of the bracket 121 away from the accommodation body 1611 by injection molding. Further the connection between the bracket 121 and the accommodation body 11 may be covered, thereby implementing the sealing of the chamber 611.

In the embodiment, the cover 16120 may include the rigid bracket 121 and the soft cover layer 122 integrally forming on the surface of the rigid bracket 121 by injection molding. The bracket 121 may be physically connected to the accommodation body 1611. The cover layer 122 may further provide sealing for the chamber 611 after the bracket 121 is connected to the accommodation body 11. The soft cover layer 122 may facilitate to fit the gap between the bracket 121 and the accommodation body 1611, thereby further improving the sealing performance of the electronic component, and improving the waterproof effect of the electronic component. At the same time, the bracket 121 and the cover layer 122 may integrally form by injection molding, which may simplify the assembly process of the electronic component.

In some embodiments, the bracket 121 may include an inserting portion 1211 and a covering portion 1212. The covering portion 1212 may be covered in the opening 112. The inserting portion 1211 may be disposed on one side of the covering portion 1212, and extend into the chamber 611 along an inner wall of the chamber 611 to fix the covering portion 1212 on the opening 112.

In some embodiments, the inserting portion 1211 may be inserted without through the inner wall of the chamber 611. For example, an inserting portion matching the shape of the inserting portion 1211 of the bracket 121 may be further disposed inside the chamber 611 so that the inserting portion 1211 may be inserted with the inserting portion to fix the inserting portion inside the chamber 611. For example, the shape of the inserting portion 1211 may be a cylinder. The inserting portion may be a cylindrical ring surrounding the inserting portion of the cylinder. As used herein, an inner diameter of the inserting portion of the cylindrical ring may be appropriately less than the outer diameter of the inserting portion of the cylindrical body. Therefore, when the inserting portion 1211 is inserted into the inserting portion, the inserting portion 1211 and the inserting portion may be in the interference fit to allow the bracket 121 to be stably connected to the chamber 611. Of course, other insertion manners may also be used as long as the inserting portion 1211 is inserted into the chamber 611 and fixed to the chamber 611.

The covering portion 1212 may be disposed on one side of the inserting portion 1211 facing away from the chamber 611, and cover the opening 112 after the inserting portion 1211 is inserted into the chamber 611. As used herein, the covering portion 1212 may be an integral structure, or may be further disposed with some holes according to requirements to implement a function.

Figure 19:
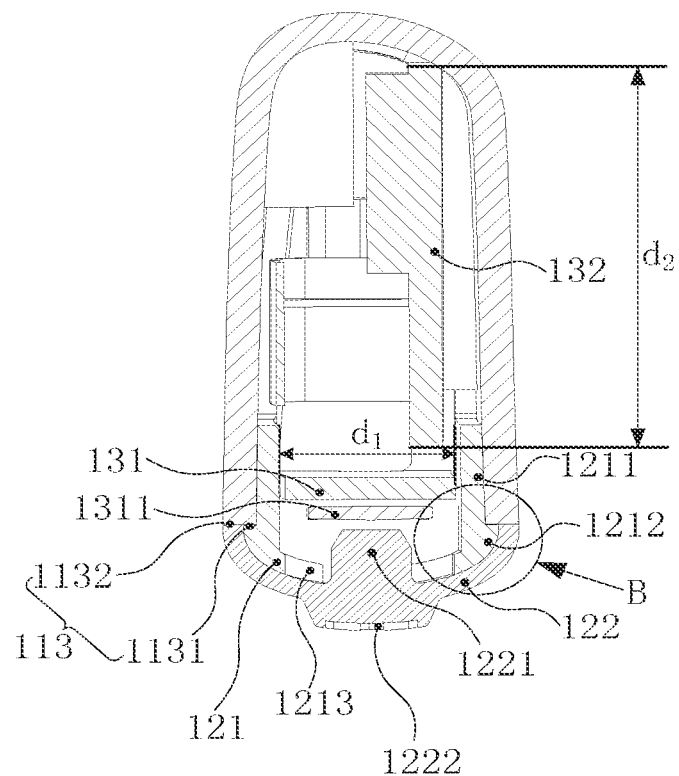
FIG. 19 is a sectional view illustrating an electronic component of eyeglasses along an A-A axis in FIG. 16 in a combined state according to some embodiments of the present disclosure.

FIG. 19 is a sectional view illustrating an electronic component of eyeglasses along an A-A axis in FIG. 16 in a combined state according to some embodiments of the present disclosure. As shown in FIG. 19, in some embodiments, the accommodation body 1611 may include an opening edge 113 for defining the opening 112. The covering portion 1212 may be pressed on an inner region 1131 of the opening edge 113 near the opening 112. The cover layer 122 may cover an outer surface of the covering portion 1212 away from the accommodation body 11 and be pressed on an outer region 1132 at the outer side of the inner region 1131 of the opening edge 113 to seal with the opening edge 113.

As used herein, the inner region 1131 and the outer region 1132 of the opening edge 113 may both belong to the opening edge 113, and may not be other regions external to the opening edge 113. As used herein, the inner region 1131 of the opening edge 113 may be a region of the opening edge 113 near the opening 112. The outer region 1132 of the opening edge 113 may be a region of the opening edge 113 away from the opening 112.

In some embodiments, the covering portion 1212 of the bracket 121 may be pressed on the inner region 1131 of the opening edge 113 near the opening 112. Therefore, the covering portion 1212 may initially seal the opening edge 113 at first. However, since the accommodation body 1611 and the bracket 121 are hard materials, the connection between the two and the further coverage of the covering portion 1212 may not have a good sealing effect. A gap may easily form between an end where the covering portion 1212 is pressed on the opening edge 113 and far from the opening 112 and the opening edge 113. The chamber 611 may further be penetrated via the gap, thereby reducing the sealing performance.

According to the above description, in the embodiment of the present disclosure, the cover layer 122 may cover the outer surface of the covering portion 1212 away from the accommodation body 1611, and be further pressed on the outer region 1132 of the periphery of the inner region 1131 of the opening edge 113. Therefore, the gap forming between the covering portion 1212 and the opening edge 113 of the bracket 121 may be further covered. Since the cover layer 122 may be a soft material, the sealing effect of the electronic component may be further improved and the electronic component may have better water resistance.

Figure 20:
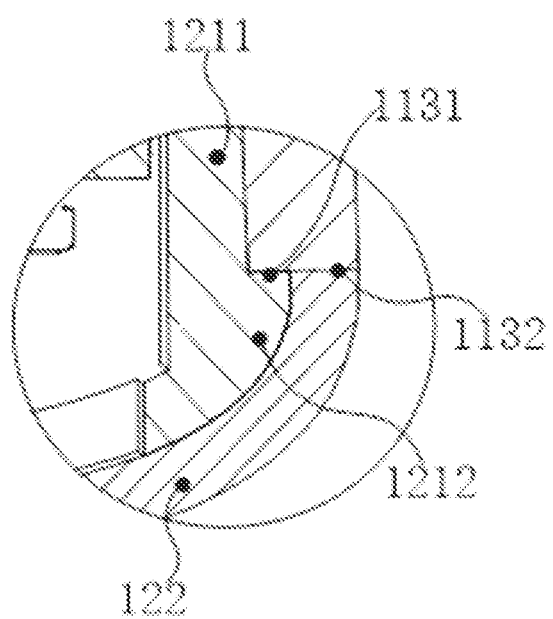
FIG. 20 is an enlarged view illustrating part B in FIG. 19 according to some embodiments of the present disclosure.

FIG. 20 is an enlarged view illustrating part B in FIG. 19. As shown in FIG. 20, in some embodiments, in a covered state of the cover 16120, the periphery of the covering portion 1212 may cover the inner region 1131 of the opening edge 113 and touch the inner region 1131 of the opening edge 113. The cover layer 122 may be disposed on the side of the covering portion 1212 away from the accommodation body 1611. Therefore, the covering portion 1212 located at the inner region 1131 of the opening edge 113 may be sandwiched between the inner region 1131 of the opening edge 113 and the cover layer 122. The cover layer 122 may further extend in a direction away from the opening 112 of the covering portion 1212 and a direction towards the opening edge 113 until it contacts the outer region 1132 of the opening edge 113. Therefore, a contact end surface of the covering portion 1212 and the opening edge 113 and a contact end surface of the cover layer 122 and the opening edge 113 may be arranged flush with each other. A structure of "opening edge 113-covering portion 1212-covering layer 122" may form on the inner region 1131 of the opening edge 113.

Figure 21:
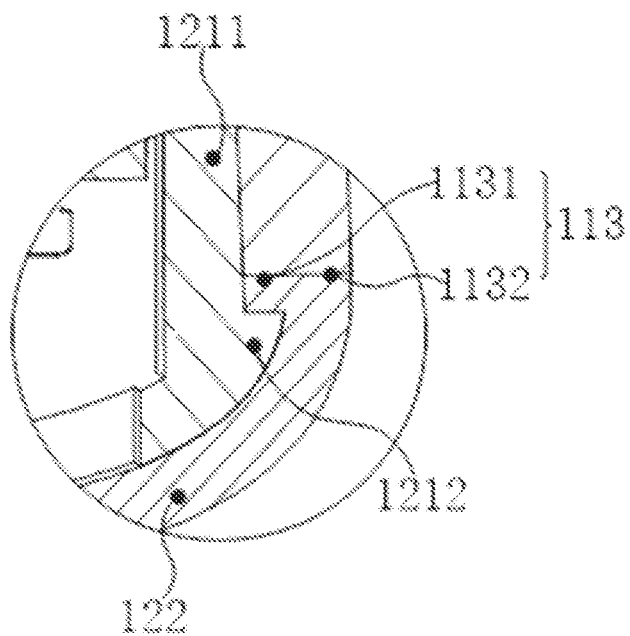
FIG. 21 is a partial sectional view according to some embodiments of the present disclosure.

FIG. 21 is a partial sectional view illustrating an electronic component according to some embodiments of the present disclosure. As shown in FIG. 21, in some embodiments, after extending to contact the outer region 1132 of the opening edge 113, the cover layer 122 may further extend along the region between the covering portion 1212 and the opening edge 113 to the inner region 1131 of the opening edge 113. It may be further assumed, between the inner region 1131 of the opening edge 113 and the covering portion 1212, the covering portion 1212 may be pressed onto the inner region 1131 of the opening edge 113 to form the structure of "opening edge 113-covering layer 122-covering portion 1212-covering layer 122". In some embodiments, the soft cover layer 122 may be further extended between the bracket 121 and the opening edge 113 on the basis of the soft covering portion 1212 covering the rigid bracket 121, thereby further improving the sealing between the chamber 611 and cover 16120, and further improving the waterproof effect of the electronic component.

Referring to FIG. 16 to FIG. 19, the electronic component may further include a circuit component 130 disposed inside the chamber 611. The circuit component 130 may be disposed with a switch 1311. In some embodiments, the circuit component 130 may include a first circuit board 131. The switch 1311 may be disposed on an outer side of the first circuit board 131 towards the opening 112 of the chamber 611. In some embodiments, the circuit component may correspond to the control circuit in FIG. 2.

Correspondingly, the bracket 121 may be disposed with a switch hole 1213 corresponding to the switch 1311. The cover layer 122 may further cover the switch hole 1213. A pressing portion 1221 may be disposed at a position corresponding to the switch hole 1213. The pressing portion 1221 may extend towards the inside of the chamber 611 through the switch hole 1213. When the corresponding position of the cover layer 122 is pressed, the pressing portion 1221 may press the switch 1311 of the circuit component 130, thereby triggering the circuit component 13 to perform a preset function.

As used herein, the pressing portion 1221 disposed on the cover layer 122 may form when the side of the cover layer 122 towards the bracket 121 protrudes in a direction facing the switch hole 1213 and the switch 1311. The shape of the pressing portion 1221 may match the switch hole 1213. Therefore, when the corresponding position of the cover layer 122 is pressed, the pressing portion 1221 may pass through the switch hole 1213 and reach the corresponding switch 1311 of the first circuit board 131. At the same time, the length of the pressing portion 1221 in the direction towards the switch 1311 may be set so that the switch 1311 may not be pressed when the position corresponding to the cover layer 122 is not pressed, and the corresponding switch 1311 may be pressed when the position corresponding to the cover layer 122 is pressed.

In some embodiments, a position of the cover layer 122 corresponding to the pressing portion 1221 may further protrude towards a side facing away from the bracket 121 to form a convex pressing portion 1222. Therefore, the user may clarify the position of the switch 1311 and trigger the circuit component 130 to perform a corresponding function by pressing the corresponding pressing portion 1222.

Figure 22:
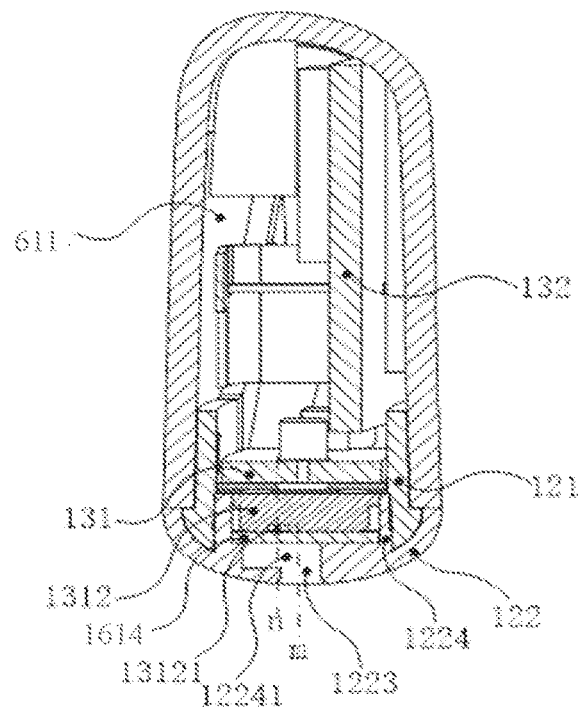
FIG. 22 is a sectional view illustrating an electronic component of eyeglasses along a B-B axis in FIG. 16 in a combined state according to some embodiments of the present disclosure.

FIG. 22 is a sectional view illustrating an electronic component in a combined state along a B-B axis in FIG. 16 according to the present disclosure. As shown in FIG. 22, the electronic component may include a first microphone element 1312. In some embodiments, the first microphone element 1312 may also be disposed on the first circuit board 131 of the circuit component 13 to be accommodated inside the chamber 611. For example, the first microphone element 1312 may be disposed on the first circuit board 131 spaced from the switch 1311 in the embodiment. The first microphone element 1312 may be used to receive a sound signal from the outside of the electronic component, and convert the sound signal into an electrical signal for analysis and processing.

In some embodiments, the bracket 121 may be disposed with a microphone hole 1214 corresponding to the first microphone element 1312. The cover layer 122 may be disposed with a first sound guiding hole 1223 corresponding to the microphone hole 1214. A first sound blocking member 1224 may be disposed at a position corresponding to the microphone hole 1214. The first sound blocking member 1224 may extend towards the inside of the chamber 611 via the microphone hole 1214 and define a sound guiding channel 12241. One end of the sound guiding channel 12241 may be in communication with the first sound guiding hole 1223 of the cover 122. The first microphone element 1312 may be inserted into the sound guiding channel 12241 from another end of the sound guiding channel 12241.

In some embodiments, the electronic component may also include the switch 1311 in the embodiment. The switch hole 1213 and the microphone hole 1214 may be disposed on the bracket 121 at intervals.

In some embodiments, the first sound guiding hole 1223 may be disposed through the cover layer 122 and correspond to the position of the first microphone element 1312. The first sound guiding hole 1223 may correspond to the microphone hole 1214 of the bracket 121, and further communicate the first microphone element 1312 with the outside of the electronic component. Therefore, a sound from the outside of the electronic component may be received by the first microphone element 1312 via the first sound guiding hole 1223 and the microphone hole 1214.

The shape of the first sound guiding hole 1223 may be any shape as long as the sound from the outside of the electronic component is able to be received by the electronic component. In some embodiments, the first sound guiding hole 1223 may be a circular hole having a relatively small size, and disposed in a region of the cover layer 122 corresponding to the microphone hole 1214. The first sound guiding hole 1223 with the small size may limit the communication between the first microphone element 1312 or the like in the electronic component and the outside, thereby improving the sealing of the electronic component.

In some embodiments, the first sound blocking member 1224 may extend to the periphery of the first microphone element 1312 from the cover layer 122, through the periphery of the first sound guiding hole 1223, the microphone hole 1214 and the inside of the chamber 611 to form the sound guiding channel 12241 from the first sound guiding hole 1223 to the first microphone element 1312. Therefore, the sound signal of the electronic component entering the sound guiding hole may directly reach the first microphone element 1312 through the sound guiding channel 12241.

In some embodiments, a shape of the sound guiding channel 12241 in a section perpendicular to the length direction may be the same as or different from the shape of the microphone hole 1214 or the first microphone element 1312. In some embodiments, the sectional shapes of the microphone hole 1214 and the first microphone element 1312 in a direction perpendicular to the bracket 121 towards the chamber 611 may be square. The size of the microphone hole 1214 may be slightly larger than the outer size of the sound guiding channel 12241. The inner size of the sound guiding channel 12241 may not be less than the outer size of the first microphone element 1312. Therefore, the sound guiding channel 12241 may pass through the first sound guiding hole 1223 to reach the first microphone element 1312 and be wrapped around the periphery of the first microphone element 1312.

Through the way described above, the cover layer 122 of the electronic component may be disposed with the first sound guiding hole 1223 and the sound guiding channel 12241 passing from the periphery of the first sound guiding hole 1223 through the microphone hole 1214 to reach the first microphone element 1312 and wrapped around the periphery of the first microphone element 1312. The sound guiding channel 12241 may be disposed so that the sound signal entering through the first sound guiding hole 1223 may reach the first microphone element 1312 via the first sound guiding hole 1223 and be received by the first microphone element 1312. Therefore, the leakage of the sound signal in the transmission process may be reduced, thereby improving the efficiency of receiving the electronic signal by the electronic component.

In some embodiments, the electronic component may also include a waterproof mesh cloth 614 disposed inside the sound guiding channel 12241. The waterproof mesh cloth 614 may be held against the side of the cover 122 towards the microphone element by the first microphone element 1312 and cover the first sound guiding hole 1223.

In some embodiments, the bracket 121 may protrude at a position of the bracket 121 close to the first microphone element 1312 in the sound guiding channel 12241 to form a convex surface opposite to the first microphone element 1312. Therefore, the waterproof mesh 614 may be sandwiched between the first microphone element 1312 and the convex surface, or directly adhered to the periphery of the first microphone element 1312, and the specific setting manner may not be limited herein.

In addition to the waterproof function for the first microphone element 1312, the waterproof mesh cloth 614 in the embodiment may also have a function of sound transmission, etc., to avoid adversely affecting the sound receiving effect of a sound receiving region 13121 of the first microphone element 1312.

In some embodiments, the cover 16120 may be arranged in a stripe shape. As used herein, a main axis of the first sound guiding hole 1223 and a main axis of the sound receiving region 13121 of the first microphone element 1312 may be spaced from each other in the width direction of the cover 16120. As used herein, the main axis of the sound receiving region 13121 of the first microphone element 1312 may refer to a main axis of the sound receiving region 13121 of the first microphone element 1312 in the width direction of the cover 16120, such as an axis n in FIG. 22. The main axis of the first sound guiding hole 1223 may be an axis m in FIG. 22.

It should be noted that, due to the setting requirements of the circuit component 130, the first microphone element 1312 may be disposed at a first position of the first circuit board 131. When the first sound guiding hole 1223 is disposed, the first sound guiding hole 1223 may be disposed at a second position of the cover 16120 due to the aesthetic and convenient requirements. In the embodiment, the first position and the second position may not correspond in the width direction of the cover 16120. Therefore, the main axis of the first sound guiding hole 1223 and the main axis of the sound receiving region 13121 of the first microphone element 1312 may be spaced from each other in the width direction of the cover 16120. Therefore, the sound input via the first sound guiding hole 1223 may not reach the sound receiving region 13121 of the first microphone element 1312 along a straight line.

In some embodiments, in order to guide the sound signal entered from the first sound guiding hole 1223 to the first microphone element 1312, the sound guiding channel 12241 may be disposed with a curved shape.

In some embodiments, the main axis of the first sound guiding hole 1223 may be disposed in the middle of the cover 16120 in the width direction of the cover 16120.

In some embodiments, the cover 16120 may be a portion of the outer housing of the electronic device. In order to meet the overall aesthetic requirements of the electronic device, the first sound guiding hole 1223 may be disposed in the middle in the width direction of the cover 16120. Therefore, the first sound guiding hole 1223 may look more symmetrical and meet the visual requirements of people.

In some embodiments, the corresponding sound guiding channel 12241 may be disposed with a stepped shape in a section along the B-B axis in FIG. 16. Therefore, the sound signal introduced by the first sound guiding hole 1223 may be transmitted to the first microphone element 1312 through the stepped sound guiding channel 12241 and received by the first microphone element 1312.

Figure 23:
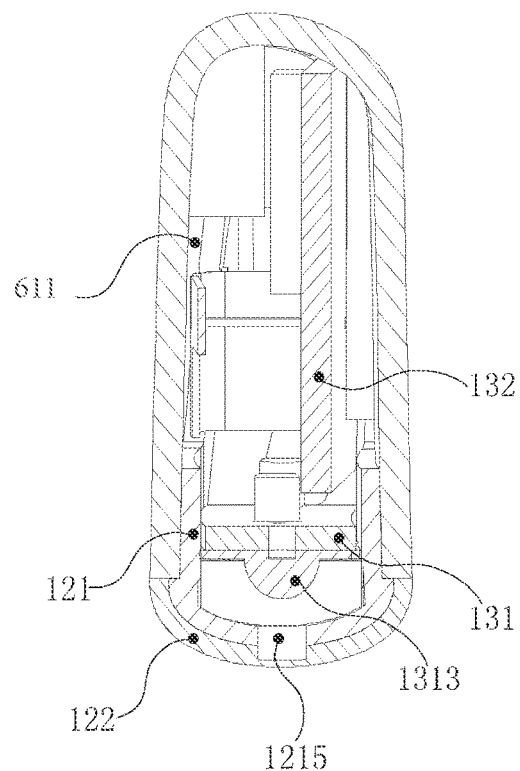
FIG. 23 is a sectional view illustrating an electronic component of eyeglasses along a C-C axis in FIG. 16 in a combined state according to some embodiments of the present disclosure.

FIG. 23 is a sectional view illustrating an electronic component in a combined state along a C-C axis in FIG. 16 according to the present disclosure. In some embodiments, the electronic component may further include a light emitting element 1313. The light-emitting element 1313 may be disposed on the first circuit board 131 of the circuit component 130 to be accommodated inside the chamber 611. For example, the light-emitting element 1313 may be disposed on the first circuit board 131 in an arrangement together with the switch 1311 and the first microphone element 1312 in the embodiment.

In some embodiments, the bracket 121 may be disposed with a light emitting hole 1215 corresponding to the light emitting element 1313. The cover layer 122 may cover the light emitting hole 1215. The thickness of a region of the cover layer 122 corresponding to the light emitting hole 1215 may be set to allow a light emitted by the light emitting element 1313 to be transmitted through the cover layer 122.

In the embodiment, the cover layer 122 may still transmit the light emitted from the light emitting element 1313 to the outside of the electronic component in a manner under a condition that the cover layer 122 covers the light emitting hole 1215.

In some embodiments, the thickness of the cover layer 122 corresponding to the entire region or a portion of the region of the light emitting hole 1215 may be set to be less than the thickness of the cover layer 122 corresponding to a region of the periphery of the light emitting hole 1215. Therefore, the light emitted by the light-emitting element 1313 may pass through the light emitting hole 1215 and be transmitted through the cover layer 122. Of course, other manners may be also adopted to make a region where the cover 122 covers the light hole 1215 may transmit the light through the cover layer 122, and be not specifically limited herein.

In some embodiments, on the basis of covering the light emitting hole 1215 corresponding to the light emitting element 1313, the cover layer 122 may be further disposed to enable to transmit the light emitted by the light emitting element 1313 through the cover layer 122 to the outside of the electronic component. Therefore, the light emitting element 1313 may be sealed by the cover layer 122 without affecting the light emitting function of the electronic component, so as to improve the sealing and waterproof performance of the electronic component.

It should be noted that the above description of the eyeglasses may be only specific examples and should not be considered as the only feasible implementation. Obviously, for those skilled in the art, after understanding the basic principles of eyeglasses, it may be possible to make various modifications and changes in the form and details of the specific method and operation of implementing the eyeglasses without departing from these principles, but these modifications and changes may still be within the scope described above. For example, the count of the at least one opening 112 may be one, or multiple, and be not limited herein. As another example, in some embodiments, the count of the switches 1311 may be one or multiple. If the count of the switches 1311 is multiple, the switches 1311 may be disposed on the first circuit board 131 at intervals. All such modifications may be within the protection scope of the present disclosure.

Figure 24:
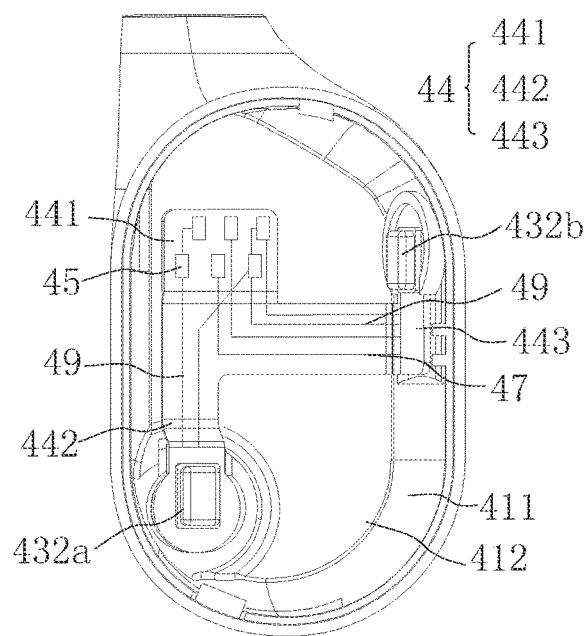
FIG. 24 is a partial structural diagram illustrating a speaker of eyeglasses according to some embodiments of the present disclosure.
Figure 25:
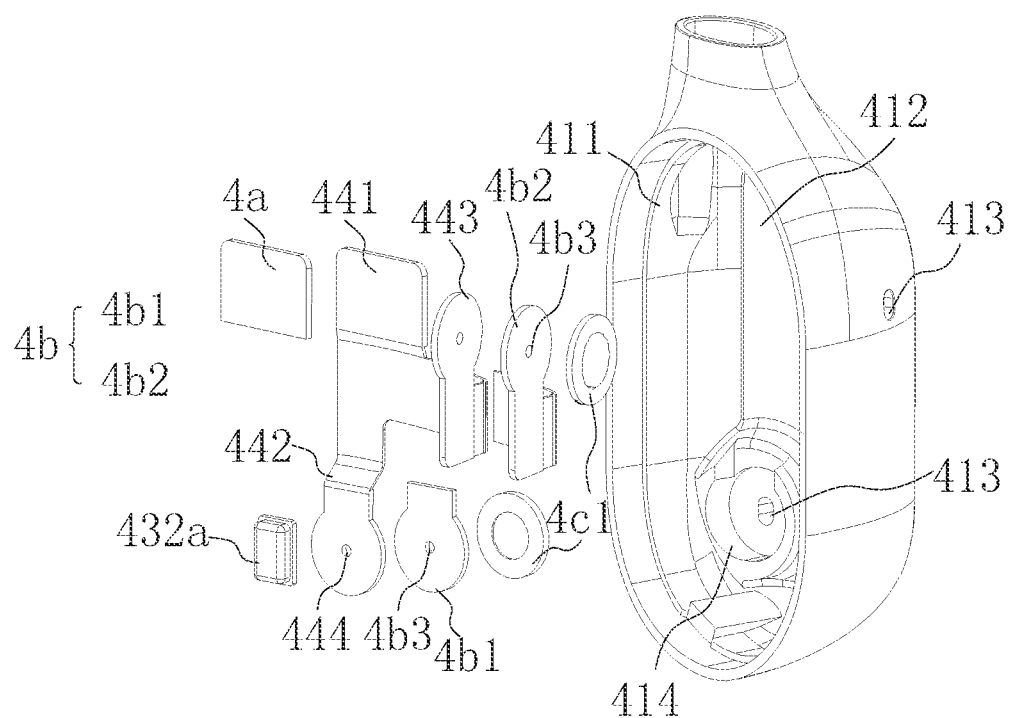
FIG. 25 is an exploded view illustrating a partial structure of a speaker of eyeglasses according to some embodiments of the present disclosure.
Figure 26:
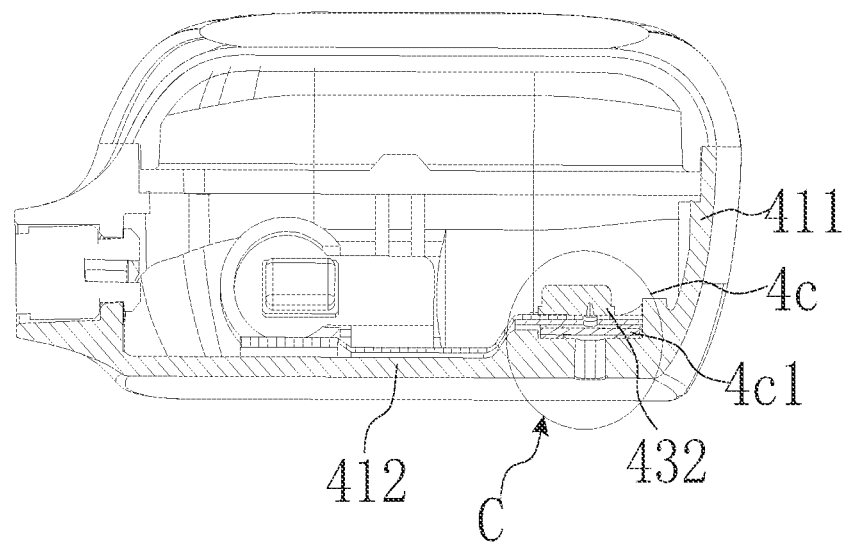
FIG. 26 is a sectional view illustrating a partial structure of a speaker of eyeglasses according to some embodiments of the present disclosure.

FIG. 24 is a partial structural diagram illustrating a speaker according to an embodiment of the present disclosure. FIG. 25 is an exploded diagram illustrating a partial structure of a speaker according to an embodiment of the present disclosure. FIG. 26 is a sectional view illustrating a partial structure of a speaker according to an embodiment of the present disclosure.

Referring to FIG. 24 and FIG. 25, in some embodiments, an auxiliary function module may include a microphone 432. The count of the microphones 432 may include two, i.e., a first microphone 432a and a second microphone 432b. As used herein, the first microphone 432a and the second microphone 432b may both be MEMS (micro-electromechanical system) microphone 432 which may have a small working current, relatively stable performance, and high voice quality. The two microphones 432 may be disposed at different positions of a flexible circuit board 44 according to actual requirements.

In some embodiments, the flexible circuit board 44 may be disposed in the speaker 21 in FIG. 1. The flexible circuit board 44 may include a main circuit board 441, and a branch circuit board 442 and a branch circuit board 443 connected to the main circuit board 441. The branch circuit board 442 may extend in the same direction as the main circuit board 441. The first microphone 432a may be disposed on one end of the branch circuit board 442 away from the main circuit board 441. The branch circuit board 443 may extend perpendicular to the main circuit board 441. The second microphone 432b may be disposed on one end of the branch circuit board 443 away from the main circuit board 441. A plurality of pads 45 may be disposed on the end of the main circuit board 441 away from the branch circuit board 442 and the branch circuit board 443.

In some embodiments, a core housing 41 may include a peripheral side wall 411 and a bottom end wall 412 connected to one end surface of the peripheral side wall 411 to form an accommodation space with an open end. As used herein, an earphone core 42 may be placed in the accommodation space through the open end. The first microphone 432a may be fixed on the bottom end wall 412. The second microphone 432b may be fixed on the peripheral side wall 411.

In some embodiments, the branch circuit board 442 and/or the branch circuit board 443 may be appropriately bent to suit a position of a sound inlet corresponding to the microphone 432 at the core housing 41. Specifically, the flexible circuit board 44 may be disposed in the core housing 41 in a manner that the main circuit board 441 is parallel to the bottom end wall 412. Therefore, the first microphone 432a may correspond to the bottom end wall 412 without bending the main circuit board 441. Since the second microphone 432b may be fixed to the peripheral side wall 411 of the core housing 41, it may be necessary to bend the second main circuit board 441. Specifically, the branch circuit board 443 may be bent at one end away from the main circuit board 441 so that a board surface of the branch circuit board 443 may be perpendicular to a board surface of the main circuit board 441 and the branch circuit board 442. Further, the second microphone 432b may be fixed at the peripheral side wall 411 of the core housing 41 in a direction facing away from the main circuit board 441 and the branch circuit board 442.

In some embodiments, the pad 45, a pad 46, the first microphone 432a, and the second microphone 432b may be disposed on the same side of the flexible circuit board 44. The pad 46 may be disposed adjacent to the second microphone 432b.

In some embodiments, the pad 46 may be specifically disposed at one end of the branch circuit board 443 away from the main circuit board 441, and have the same orientation as the second microphone 432b and disposed at intervals. Therefore, the pad 46 may be perpendicular to the orientation of the pad 45 as the branch circuit board 443 is bent. It should be noted that the board surface of the branch circuit board 443 may not be perpendicular to the board surface of the main circuit board 441 after the branch circuit board 443 is bent, which may be determined according to the arrangement between the peripheral side wall 411 and the bottom end wall 412.

In some embodiments, another side of the flexible circuit board 44 may be disposed with a rigid support plate 4a and a microphone rigid support plate 4b for supporting the pad 45. The microphone rigid support plate 4b may include a rigid support plate 4b1 for supporting the first microphone 432a and a rigid support plate 4b2 for supporting the pad 46 and the second microphone 432b together.

In some embodiments, the rigid support plate 4a, the rigid support plate 4b1, and the rigid support plate 4b2 may be mainly used to support the corresponding pads and the microphone 432, and thus may need to have strengths. The materials of the three may be the same or different. The specific material may be polyimide (PI), or other materials that may provide the strengths, such as polycarbonate, polyvinyl chloride, etc. In addition, the thicknesses of the three rigid support plates may be set according to the strengths of the rigid support plates and actual strengths required by the pad 45, the pad 46, the first microphone 432a, and the second microphone 432b, and be not specifically limited herein.

The first microphone 432a and the second microphone 432b may correspond to two microphone components 4c, respectively. In some embodiments, the structures of the two microphone components 4c may be the same. A sound inlet 413 may be disposed on the core housing 41. Further, the speaker may be further disposed with an annular blocking wall 414 integrally formed on the inner surface of the core housing 41 at the core housing 41, and disposed at the periphery of the sound inlet 413, thereby defining an accommodation space 415 connected to the sound inlet 413.

Referring to FIG. 24, FIG. 25, and FIG. 26, in some embodiments, the microphone component 4c may further include a waterproof membrane component 4c1.

As used herein, the waterproof membrane component 4c1 may be disposed inside the accommodation space 415 and cover the sound inlet 413. The microphone rigid support plate 4b may be disposed inside the accommodation space 415 and located at one side of the waterproof membrane component 4c1 away from the sound inlet 413. Therefore, the waterproof membrane component 4c1 may be pressed on the inner surface of the core housing 41. In some embodiments, the microphone rigid support plate 4b may be disposed with a sound inlet 4b3 corresponding to the sound inlet 413. In some embodiments, the microphone 432 may be disposed on one side of the microphone rigid support plate 4b away from the waterproof membrane component 4c1 and cover the sound inlet 4b3.

As used herein, the waterproof membrane component 4c1 may have functions of waterproofing and transmitting the sound, and closely attached to the inner surface of the core housing 41 to prevent the liquid outside the core housing 41 entering the core housing 41 via the sound inlet 413 and affect the performance of the microphone 432.

The axial directions of the sound inlet 4b3 and the sound inlet 413 may overlap, or intersect at an angle according to actual requirements of the microphone 432, etc.

The microphone rigid support plate 4b may be disposed between the waterproof membrane component 4c1 and the microphone 432. On the one hand, the waterproof membrane component 4c1 may be pressed so that the waterproof membrane component 4c1 may be closely attached to the inner surface of the core housing 41. On the other hand, the microphone rigid support plate 4b may have a strength, thereby playing the role of supporting the microphone 432.

In some embodiments, the material of the microphone rigid support plate 4b may be polyimide (PI), or other materials capable of providing the strength, such as polycarbonate, polyvinyl chloride, or the like. In addition, the thickness of the microphone rigid support plate 4b may be set according to the strength of the microphone rigid support plate 4b and the actual strength required by the microphone 432, and be not specifically limited herein.

Figure 27:
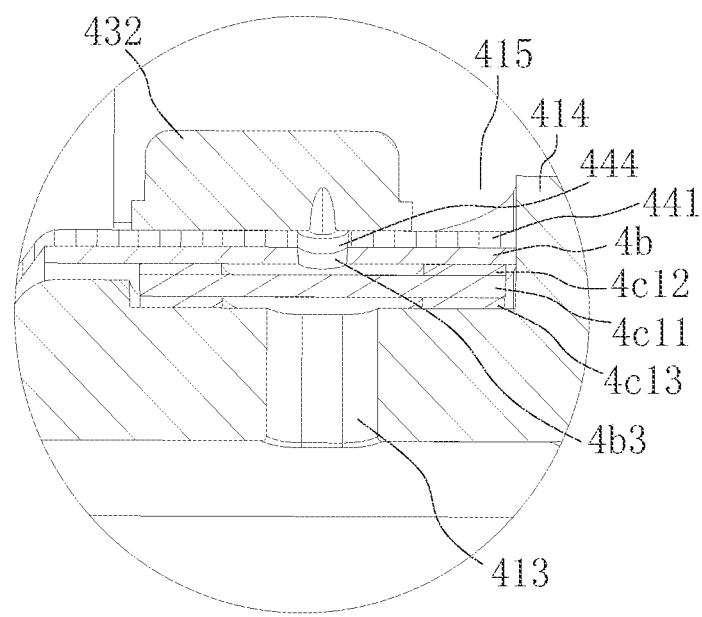
FIG. 27 is a partial enlarged view illustrating part C in FIG. 26 according to some embodiments of the present disclosure.
Figure 28:
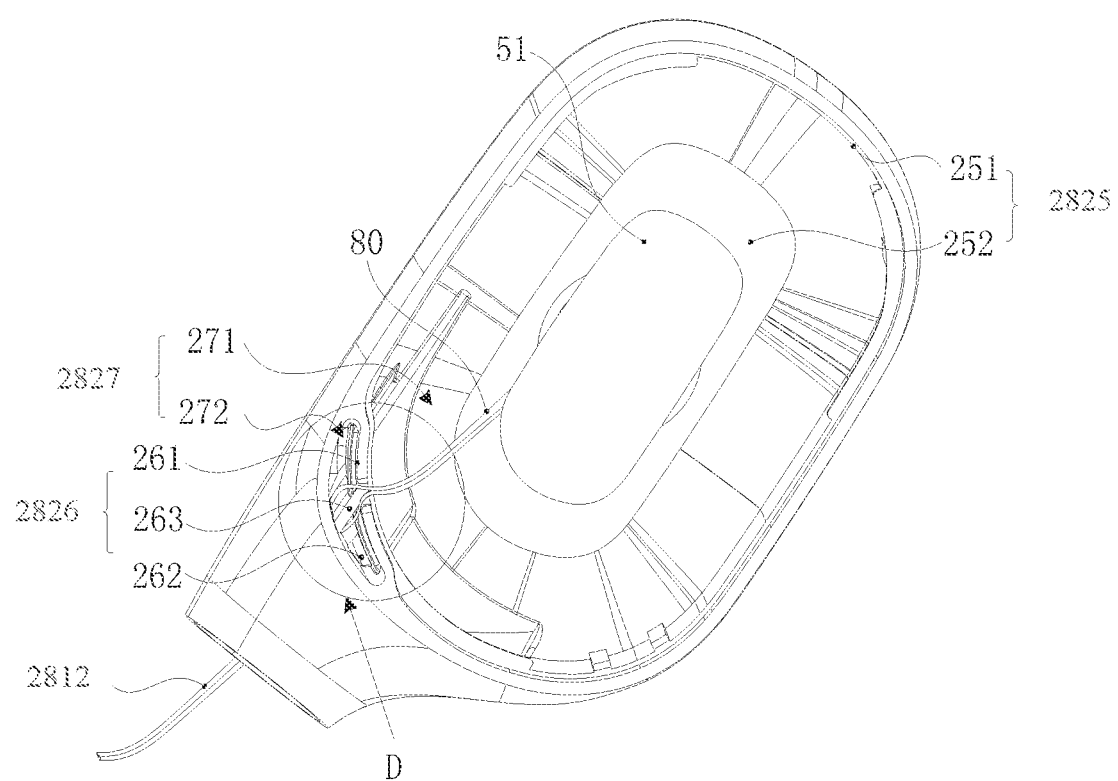
FIG. 28 is a partial structural diagram illustrating a core housing of a speaker of eyeglasses according to some embodiments of the present disclosure.

FIG. 27 is a partially enlarged view illustrating part C in FIG. 26 according to some embodiments of the present disclosure. As shown in FIG. 28, in some embodiments, the waterproof membrane component 4c1 may include a waterproof membrane body 4c11 and an annular rubber gasket 4c12. The annular rubber gasket 4c12 may be disposed at one side of the waterproof membrane body 4c11 towards the microphone rigid support plate 4b, and further disposed on the periphery of the sound inlet 413 and the sound inlet 4b3.

As used herein, the microphone rigid support plate 4b may be pressed against the annular rubber gasket 4c12. Therefore, the waterproof membrane component 4c1 and the microphone rigid support plate 4b may be adhered and fixed together.

In some embodiments, the annular rubber gasket 4c12 may be arranged to form a sealed chamber communicating with the microphone 432 and only through the sound inlet 4b3 between the waterproof membrane body 4c11 and the rigid support plate. That is, there may be no gap in a connection between the waterproof membrane component 4c1 and the microphone rigid support plate 4b. Therefore, a space around the annular rubber gasket 4c12 between the waterproof membrane body 4c11 and the microphone rigid support plate 4b may be isolated from the sound inlet 4b3.

In some embodiments, the waterproof membrane body 4c11 may be a waterproof and sound-transmitting membrane and be equivalent to a human eardrum. When an external sound enters via the sound inlet 413, the waterproof membrane body 4c11 may vibrate, thereby changing an air pressure in the sealed chamber and generating a sound in the microphone 432.

Further, since the waterproof membrane body 4c11 may change the air pressure in the sealed chamber during the vibration, the air pressure may need to be controlled within an appropriate range. If it is too large or too small, it may affect the sound quality. In the embodiment, a distance between the waterproof membrane body 4c11 and the rigid support plate may be 0.1-0.2 mm, specifically 0.1 mm, 0.15 mm, 0.2 mm, etc. Therefore, the change of the air pressure in the sealed chamber during the vibration of the waterproof film body 4c11 may be within the appropriate range, thereby improving the sound quality.

In some embodiments, the waterproof membrane component 4c1 may further include an annular rubber gasket 4c13 disposed on the waterproof membrane body 4c11 towards the inner surface side of the core housing 41 and overlapping the annular rubber gasket 4c12.

In this way, the waterproof membrane component 4c1 may be closely attached to the inner surface of the core housing 41 at the periphery of the sound inlet 413, thereby reducing the loss of the sound entered via the sound inlet 413, and improving a conversion rate of converting the sound into the vibration of the waterproof membrane body 4c11.

In some embodiments, the annular rubber gasket 4c12 and the annular rubber gasket 4c13 may be a double-sided tape, a sealant, etc., respectively.

In some embodiments, the sealant may be further coated on the peripheries of the annular blocking wall 414 and the microphone 432 to further improve the sealing, thereby improving the conversion rate of the sound and the sound quality.

In some embodiments, the flexible circuit board 44 may be disposed between the rigid support plate and the microphone 432. A sound inlet 444 may be disposed at a position corresponding to the sound inlet 4b3 of the microphone rigid support plate 4b. Therefore, the vibration of the waterproof membrane body 4c11 generated by the external sound may pass through the sound inlet 444, thereby further affecting the microphone 432.

Referring to FIG. 25, in some embodiments, the flexible circuit board 44 may further extend away from the microphone 432, so as to be connected to other functional components or wires to implement corresponding functions. Correspondingly, the microphone rigid support plate 4b may also extend out a distance with the flexible circuit board in a direction away from the microphone 432.

Correspondingly, the annular blocking wall 414 may be disposed with a gap matching the shape of the flexible circuit board to allow the flexible circuit board to extend from the accommodation space 415. In addition, the gap may be further filled with the sealant to further improve the sealing.

It should be noted that the above description of the microphone waterproof is only a specific example, and should not be considered as the only feasible implementation. Obviously, for those skilled in the art, after understanding the basic principles of microphone waterproofing, it is possible to make various modifications and changes in the form and details of the specific method and step of implementing the microphone waterproof without departing from this principle, but these modifications and changes are still within the scope described above. For example, the count of the sound inlets 413 may be set as one or multiple. All such modifications are within the protection scope of the present disclosure.

Figure 29:
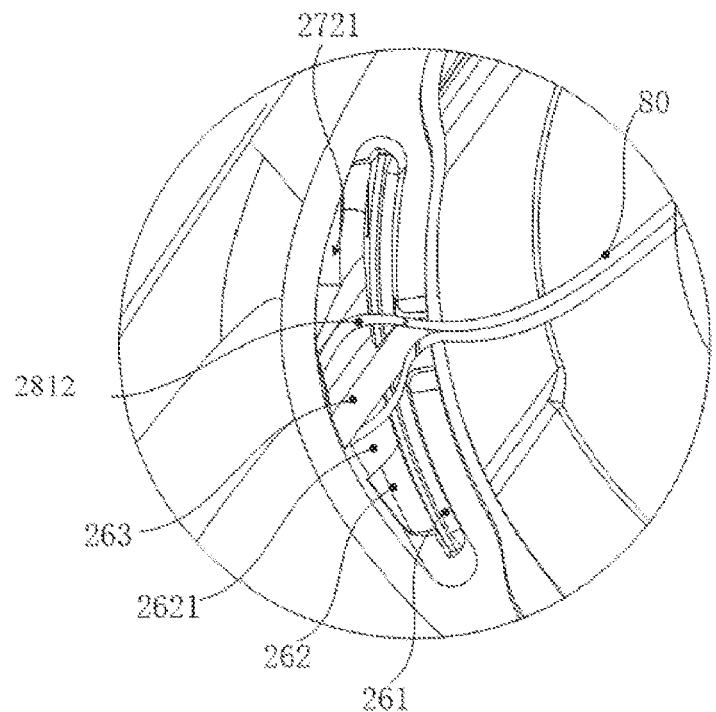
FIG. 29 is a partial enlarged view illustrating part D in FIG. 28 according to some embodiments of the present disclosure.
Figure 30:
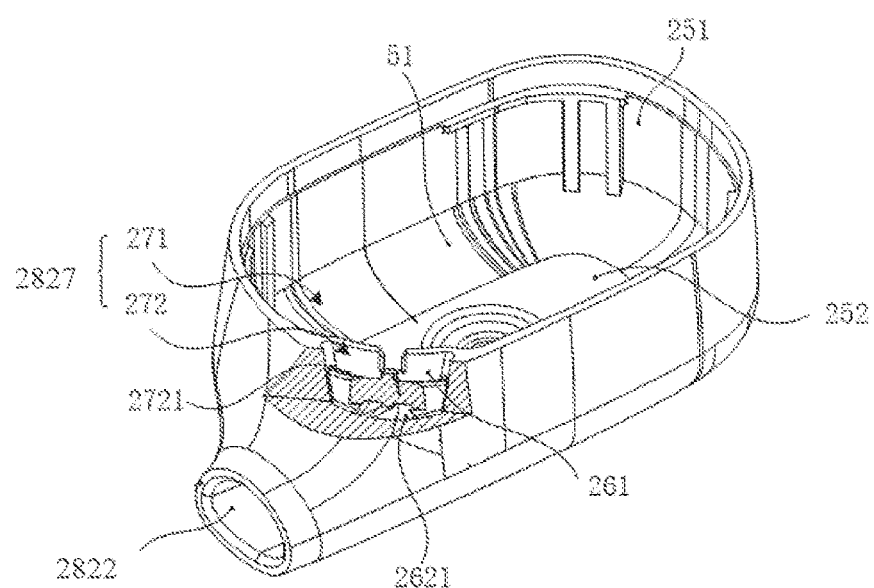
FIG. 30 is a partial sectional view illustrating a core housing of a speaker of eyeglasses according to some embodiments of the present disclosure.

FIG. 28 is a partial structural diagram illustrating a core housing of the speaker 21 according to some embodiments of the present disclosure. FIG. 29 is a partial enlarged view illustrating D part in FIG. 28 according to some embodiments of the present disclosure. FIG. 30 is a partial sectional view illustrating a core housing of the speaker 21 according to some embodiments of the present disclosure.

Referring to FIG. 28, FIG. 29, FIG. 30, and FIG. 1, the core housing may be disposed in the speaker 21 in FIG. 1. The core housing may include a main housing 2825 and a baffle component 2826. As used herein, the baffle component 2826 may be located inside the main housing 2825 and connected to the main housing 2825, thereby dividing an inner space 2827 of the main housing 2825 into a first accommodation space 271 and a second accommodation space 272 near a connection hole 2822. In some embodiments, the main housing 2825 may include a peripheral side wall 251 and a bottom end wall 252 connected to one end surface of the peripheral side wall 251. The peripheral side wall 251 and the bottom end wall 252 may together form the inner space 2827 of the main housing 2825.

In some embodiments, the baffle component 2826 may be located at one side of the main housing 2825 near the connection hole 2822 and include a side baffle 261 and a bottom baffle 262. As used herein, the side baffle 261 may be disposed in a direction perpendicular to the bottom end wall 252. Both ends of the side baffle 261 may be connected to the peripheral side wall 251, so as to space the inner space 2827 of the main housing 2825. The bottom baffle 262 may be parallel to or close to the bottom end wall 252 at intervals, and further connected to the peripheral side wall 251 and the side baffle 261, respectively. Therefore, the inner space 2827 formed by the main housing 2825 may be divided into two to form the first accommodation space 271 and the second accommodation space 272. The first accommodation space 271 may be surrounded by the side baffle 261, the bottom baffle 262, the peripheral side wall 251 away from the connection hole 2822, and the bottom end wall 252. The second accommodation space 272 may be surrounded by the bottom baffle 262, the side baffle 261, and the peripheral side wall 251 near the connection hole 2822. As used herein, the second accommodation space 272 may be less than the first accommodation space 271. In some embodiments, the baffle component 2826 may also divide the inner space 2827 of the main housing 2825 by other setting manners, and be not specifically limited herein.

In some embodiments, the baffle component 2826 may further include an inner baffle 263. The inner baffle 263 may further divide the second accommodation space 272 into two sub-accommodation spaces 2721. Specifically, the inner baffle 263 may be disposed perpendicular to the bottom end wall 252 of the main housing 2825, respectively connected to the side baffle 261 and the peripheral side wall 251, and further extend to a wiring hole 2621. Thus, while the second accommodation space 272 may be divided into the two sub-accommodation spaces 2721, the wiring hole 2621 may be further divided into two, and the two wiring holes 2621 may be communicated with the corresponding sub-accommodation spaces 2721.

In some embodiments, the second accommodation space 272 may be further filled with the sealant. In this way, a lead wire 2812 and a lead wire 80 accommodated inside the second accommodation space 272 may be further fixed, so as to further reduce the adverse effect on the sound quality caused by the vibration of the lead wires and improve the sound quality of the speaker while protecting a welding point between the lead 2812 and the lead 80. In addition, the second accommodation space 272 may be sealed to implement the waterproof and dustproof purposes.

It should be noted that the above description of the speaker is only a specific example and should not be considered as the only feasible implementation solution.

Obviously, for those skilled in the art, after understanding the basic principles of the speaker, it is possible to make various modifications and changes in the form and details of the specific method and step of implementing the speaker without departing from these principles, but these modifications and changes are still within the scope described above. For example, the second accommodation space 272 may also be larger than the first accommodation space 271. Alternatively, the second accommodation space 272 may be equal to the first accommodation space 271. All such modifications are within the protection scope of the present disclosure.

In some embodiments, the speaker described above may transmit the sound to the user through bone conduction and/or air conduction. When the air conduction is used to transmit the sound, the speaker may include one or more sound sources. The sound source may be located at a specific position of the user's head, for example, the top of the head, the forehead, a cheek, a temple, an auricle, the back of an auricle, etc., without blocking or covering an ear canal. For the purposes of description, FIG. 31 shows a schematic diagram of transmitting the sound through the air conduction according to some embodiments of the present disclosure.

Figure 31:
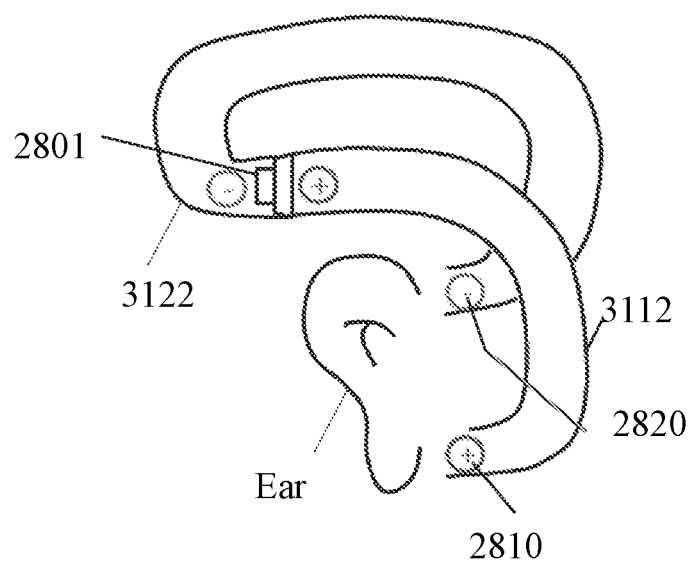
FIG. 31 is a schematic diagram of transmitting a sound through air conduction according to some embodiments of the present disclosure.

As shown in FIG. 31, a sound source 2810 and a sound source 2820 may generate sound waves with opposite phases ("+" and "−" in the figure may indicate the opposite phases). For brevity, the sound sources mentioned herein may refer to sound outlets of the speaker that may output sounds. For example, the sound source 2810 and the sound source 2820 may be two sound outlets respectively located at specific positions of the speaker (e.g., the core housing 41 or the eyeglass temple 12).

In some embodiments, the sound source 2810 and the sound source 2820 may be generated by a same vibration device 2801. The vibration device 2801 may include a diaphragm (not shown in the figure). When the diaphragm is driven to vibrate by an electric signal, the front side of the diaphragm may drive the air to vibrate. The sound source 2810 may form at the sound outlet through a sound guiding channel 3112. The back of the diaphragm may drive air to vibrate, and the sound source 2820 may be formed at the sound outlet through a sound guiding channel 3122. The sound guiding channel may refer to a sound transmission route from the diaphragm to the corresponding outlet. In some embodiments, the sound guiding channel may be a route surrounded by a specific structure (e.g., the core housing 41, or the eyeglass temple 12) of a speaker. It should to be known that in some alternative embodiments, the sound source 2810 and the sound source 2820 may also be generated by different vibrating diaphragms of different vibration devices, respectively.

Among the sounds generated by the sound source 2810 and the sound source 2820, one part may be transmitted to the ears of the user to form the sound heard by the user. Another part may be transmitted to the environment to form a leaked sound. Considering that the sound source 2810 and the sound source 2820 are closer to the ears of the user, for the convenience of description, the sound transmitted to the ears of the user may be referred to as a near-field sound. The leaked sound transmitted to the environment may be referred to as a far-field sound. In some embodiments, the near-field/far-field sounds of different frequencies generated by the speaker may be related to a distance between the sound source 2810 and the sound source 2820. Generally speaking, the near-field sound generated by the speaker may increase as the distance between the two sound sources increases, while the generated far-field sound (the leaked sound) may increase by increasing the frequency.

For the sounds of different frequencies, the distance between the sound source 2810 and the sound source 2820 may be designed, respectively, so that a low-frequency near-field sound (e.g., a sound with a frequency of less than 800 Hz) generated by the speaker may be as large as possible and a high-frequency far-field sound (e.g., a sound with a frequency greater than 2000 Hz) may be as small as possible. In order to implement the above purposes, the speaker may include two or more sets of dual sound sources. Each set of the dual sound sources may include two sound sources similar to the sound source 2810 and the sound source 2820, and generate sounds with specific frequencies, respectively. Specifically, a first set of the dual sound sources may be used to generate low frequency sounds. A second set of the dual sound sources may be used to generate high frequency sounds. In order to obtain more low-frequency near-field sounds, the distance between the two sound sources in the first set of the dual sound sources may be set as a larger value. Since the low-frequency signal may have a longer wavelength, the larger distance between the two sound sources may not cause a large phase difference in the far-field, and not form excessive leaked sounds in the far-field. In order to make the high-frequency far-field sound smaller, the distance between the two sound sources in the second set of the dual sound sources may be set as a smaller value. Since the high-frequency signal has a shorter wavelength, the smaller distance between the two sound sources may avoid the generation of the large phase difference in the far-field, and thus the generation of the excessive leaked sounds may be avoided. The distance between the second set of the dual sound sources may be less than the distance between the first set of the dual sound sources.

The beneficial effects of the present disclosure embodiment may include but are not limited to the following. (1) In the present disclosure, when the hinge arm is rotated relative to the hinge mount by the external force, the hinge may have an appropriate change, thereby providing convenience for users. (2) The second accommodation space may be filled with the sealant to fix the wires disposed therein, which may reduce the influence of the wire vibration on the sound quality, thereby improving the sound quality of the speaker device. In addition, the sealant filled in the second accommodation space may protect the welding point between the wires. The sealing of the second accommodation space may have the waterproof and dustproof functions. (3) The waterproof performance of the eyeglasses may be improved to protect the inner structure of the eyeglasses. It should be noted that different embodiments may have different beneficial effects. In different embodiments, possible beneficial effects may be any one or a combination of the above, and may be any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "device," "unit," "component," or "system." Furthermore, aspects of the present disclosure may take the form of a computer program product embodied in one or more computer-readable media having computer-readable program code embodied thereon.

A computer-readable signal medium may include a propagated data signal with computer-readable program code embodied therein, for example, in baseband or as portion of a carrier wave. Such a propagated signal may take any of a variety of forms, including electro-magnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. Eyeglasses, wherein the eyeglasses include:
   an eyeglass frame, the eyeglass frame comprising an eyeglass rim and two eyeglass temples, and the two eyeglass temples being rotatably connected to the eyeglass rim, respectively; and
   two speakers, the two speakers comprising an earphone core, the two speakers being connected to the two eyeglass temples via hinge components of the two eyeglass temples, respectively, and each hinge components being rotatable to change a position of its connected speakers relative to one of the two eyeglass temples, wherein
      each of the eyeglass temples includes an accommodation body and a cover, the accommodation body includes a chamber, an end of the chamber has an opening, the cover is disposed on the opening to seal the chamber, and the eyeglass temple includes a circuit component to drive the earphone core to vibrate to generate a sound;
      wherein the speaker further includes:
         a core housing, the core housing being disposed with a first sound inlet;
         an annular blocking wall formed on an inner surface of the core housing and disposed on a periphery of the first sound inlet, thereby defining an accommodation space connected to the first sound inlet; and
         a waterproof membrane component disposed inside the accommodation space, and covering the first sound inlet; and
         a rigid support plate disposed in the accommodation space and presses the waterproof membrane component on the inner surface of the core housing, and the rigid support plate being disposed with a second sound inlet.

2. The eyeglasses of claim 1, wherein the hinge component includes a hinge, a rod-shaped member, and a fixing member, and the hinge includes:
   a hinge mount;
   a hinge arm rotatably connected to the hinge mount via a rotating shaft, and being rotatable relative to the hinge mount when an external force is applied to the hinge arm to change the position of the speaker relative to the eyeglass temple;
   a support member flexibly disposed on the hinge mount; and
   an elastic member configured to elastically offset the support member toward the hinge arm, so that the support member elastically abuts on the hinge arm.

3. The eyeglasses of claim 2, wherein
   the hinge arm includes a first support surface and a second support surface connected to each other;
   the support member includes a third support surface;
   when the elastic member elastically offsets the support member toward the hinge arm, the third support surface elastically abuts on the first support surface and the second support surface, respectively; and
   when the hinge arm is rotated relative to the hinge mount by the external force, a connection between the first support surface and the second support surface drives the support member against the elastic offset of the elastic member to move in an opposite direction, so that the third support surface is switched from being elastically abutting on one of the first support surface and the second support surface to being elastically abutting on the other of the first support surface and the second support surface.

4. The eyeglasses of claim 3, wherein an external force required when the third support surface is switched from elastically abutting on the first support surface to elastically abutting on the second support surface is less than an external force required when the third support surface is switched from elastically abutting on the second support surface to elastically abutting on the first support surface, wherein the third support surface elastically abutting on the second support surface corresponds to a situation where the speaker is used, and the third support surface elastically abutting on the first support surface corresponds to a situation where the speaker is not used.

5. The eyeglasses of claim 3, wherein
the hinge mount includes a mount body, and a first lug and a second lug protruding from the mount body and spaced from each other; and
the hinge arm includes an arm body and a third lug protruding from the arm body, the third lug is inserted into an interval region between the first lug and the second lug, and rotatably connected to the first lug and the second lug via the rotating shaft.

6. The eyeglasses of claim 5, wherein
the support member is at least partially disposed inside the interval region and located at a side of the third lug towards the mount body; and
the mount body is disposed with an accommodation chamber communicating with the interval region, the elastic member is disposed inside the accommodation chamber, and the support member elastically offsets toward the third lug.

7. The eyeglasses of claim 1, wherein the cover includes a bracket and a cover layer integrally forming on a surface of the bracket by injection molding, the bracket is used to be physically connected to the accommodation body, and the cover layer is used to seal the chamber after the bracket is connected to the accommodation body.

8. The eyeglasses of claim 7, wherein a shape of a side of the bracket towards the accommodation body matches the opening to cover the opening, and the cover layer covers an outer surface of the bracket away from the accommodation body.

9. The eyeglasses of claim 8, wherein
the bracket includes an inserting portion and a covering portion, the covering portion is disposed on the opening, and the inserting portion is disposed on a side of the covering portion and extends into the chamber along an inner wall of the chamber to fix the covering portion on the opening.

10. The eyeglasses of claim 9, wherein the accommodation body includes an opening edge for defining the opening, the covering portion is pressed onto an inner region of the opening edge near to the opening, the cover layer covers the outer surface of the covering portion away from the accommodation body, and is pressed onto an outer region of a periphery of the inner region of the opening edge, thereby sealing the cover with the opening edge.

11. The eyeglasses of claim 10, wherein a contact end surface of the covering portion and the opening edge and a contact end surface of the cover layer and the opening edge are flush with each other in a covered state, or the cover layer further extends between the covering portion and the opening edge, and the covering portion is pressed onto the inner region of the opening edge.

12. The eyeglasses of claim 8, wherein
a switch is disposed on the circuit component;
the bracket is disposed with a switch hole corresponding to the switch and the cover layer covers the switch hole;
a pressing portion is disposed at a position corresponding to the switch hole and the pressing portion extends toward an inside of the chamber through the switch hole; and
when the corresponding position of the cover layer is pressed, the pressing portion presses the switch of the circuit component, thereby triggering the circuit component to perform a preset function.

13. The eyeglasses of claim 1, wherein
the waterproof membrane component includes a waterproof membrane body and a first annular rubber cushion disposed on one side of the waterproof membrane body towards the rigid support plate,
the first annular rubber cushion is disposed on the periphery of the first sound inlet and a periphery of the second sound inlet, and
the rigid support plate is pressed against the first annular rubber cushion.

14. The eyeglasses of claim 13, wherein the first annular rubber cushion is arranged to form a sealed chamber communicating to the microphone and only through the second sound inlet between the waterproof membrane body and the rigid support plate.

15. The eyeglasses of claim 1, wherein the waterproof membrane component further includes a second annular rubber cushion disposed on one side of the waterproof membrane body towards the inner surface of the core housing and overlapping the first annular rubber cushion.

16. The eyeglasses of claim 1, wherein
the core housing includes a main housing and a baffle component,
the baffle component is located inside the main housing and connected to the main housing, thereby dividing an inner space of the main housing into a first accommodation space and a second accommodation space; and
the core housing is further disposed with a connection hole communicating with an outer end surface of the core housing.

17. The eyeglasses of claim 16, wherein the second accommodation space is disposed near the connection hole.

18. The eyeglasses of claim 16, wherein the main housing includes a peripheral side wall and a bottom end wall connected to one end surface of the peripheral side wall.

19. The eyeglasses of claim 18, wherein
the baffle component includes a side baffle connected at both ends to the peripheral side wall and a bottom baffle spaced from the bottom end wall and connected to the peripheral side wall and the side baffle, respectively;
the bottom baffle is disposed with a wiring hole; and
the side baffle is disposed with a wiring groove at a top edge away from the bottom end wall.

20. The eyeglasses of claim 4, wherein when the third support surface is switched from elastically abutting on the first support surface to elastically abutting on the second support surface, the connection initially contacts a first position of the third support surface;
when the third support surface is switched from the elastically abutting on the second support surface to elastically abutting on the first support surface, the connection initially contacts a second position of the third support surface;
in a section perpendicular to a central axis of the rotating shaft, a distance between the first position and a contact point of the elastic member and the support member in a direction of the elastic offset of the elastic member is less than a distance between the second position and the contact point of the elastic member and the support member in the direction of the elastic offset of the elastic member.

* * * * *